United States Patent
Jamali et al.

(10) Patent No.: US 11,175,507 B2
(45) Date of Patent: Nov. 16, 2021

(54) POLARIZATION-SENSITIVE COMPONENTS IN OPTICAL SYSTEMS FOR LARGE PUPIL ACCEPTANCE ANGLES

(71) Applicant: FACEBOOK TECHNOLOGIES, LLC, Menlo Park, CA (US)

(72) Inventors: Afsoon Jamali, Redmond, WA (US); Lu Lu, Kirkland, WA (US); Andrew Maimone, Duvall, WA (US); Alireza Moheghi, Bothell, WA (US); Wai Sze Tiffany Lam, Vancouver (CA); Scott Charles McEldowney, Redmond, WA (US); Douglas Robert Lanman, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 53 days.

(21) Appl. No.: 16/273,021

(22) Filed: Feb. 11, 2019

(65) Prior Publication Data
US 2020/0081252 A1      Mar. 12, 2020

Related U.S. Application Data

(60) Provisional application No. 62/643,691, filed on Mar. 15, 2018, provisional application No. 62/772,598, filed on Nov. 28, 2018.

(51) Int. Cl.
*G02B 5/18* (2006.01)
*G02B 27/01* (2006.01)
(Continued)

(52) U.S. Cl.
CPC ....... *G02B 27/0172* (2013.01); *G02B 5/1828* (2013.01); *G02B 5/1842* (2013.01);
(Continued)

(58) Field of Classification Search
CPC .......... G02B 27/0172; G02B 5/1828; G02B 5/1842; G02B 5/3083; G02B 26/106;
(Continued)

(56) References Cited

U.S. PATENT DOCUMENTS 7,397,525 B2     7/2008   Tago et al.
7,848,020 B2 *  12/2010   Hendrix ............... G02B 5/3016
                                                                  359/582

(Continued)

FOREIGN PATENT DOCUMENTS

EP            3351978 A1      7/2018
WO       WO/01/09685 A1       2/2001
(Continued)

OTHER PUBLICATIONS

AlphaMicron—The World's Fastest Tint-Changing Technology, http://alphamicron.com/, retrieved Feb. 28, 2020, 4 pages.
(Continued)

*Primary Examiner* — Mustak Choudhury
(74) *Attorney, Agent, or Firm* — Morgan, Lewis & Bockius LLP

(57) ABSTRACT

A near eye display (NED) includes an electronic display configured to output image light. Further, the NED includes an eye tracking module and multiple optical elements that are combined to form an optical system to allow for changes in position of one or both eyes of a user of the NED. Various types of such optical elements, which may have optical states that are switchable, may be used to steer a light beam toward the user's eye. A direction of the steering may be based on eye tracking information measured by the eye tracking module.

20 Claims, 22 Drawing Sheets

(51) Int. Cl.
  *G02B 5/30* (2006.01)
  *G02B 26/10* (2006.01)
  *G02B 27/00* (2006.01)
  *G02F 1/29* (2006.01)

(52) U.S. Cl.
  CPC ......... *G02B 5/3083* (2013.01); *G02B 26/106* (2013.01); *G02B 27/0093* (2013.01); *G02F 1/29* (2013.01); *G02B 2027/0123* (2013.01); *G02B 2027/0178* (2013.01); *G02F 1/294* (2021.01); *G02F 2203/07* (2013.01)

(58) Field of Classification Search
  CPC ........ G02B 27/0093; G02B 2027/0123; G02B 2027/0178; G02B 27/0179; G02B 27/286; G02B 26/0808; G02B 2027/0187; G02F 1/29; G02F 2001/294; G02F 2203/07; G02F 1/0136
  See application file for complete search history.

(56) References Cited

U.S. PATENT DOCUMENTS

| | | | |
|---|---|---|---|
| 9,335,548 | B1* | 5/2016 | Cakmakci ............... G06F 3/017 |
| 9,976,911 | B1* | 5/2018 | Tabirian ................ G01J 1/4257 |
| 10,120,193 | B2 | 11/2018 | Lam |
| 10,151,961 | B2* | 12/2018 | Lu ........................... G02F 1/137 |
| 10,451,947 | B1 | 10/2019 | Lu et al. |
| 10,539,829 | B1* | 1/2020 | Lu ............................. G02F 1/13 |
| 10,546,430 | B1 | 1/2020 | Lu et al. |
| 2007/0258029 | A1 | 11/2007 | Nakagawa et al. |
| 2009/0279023 | A1* | 11/2009 | Smith ............... G02F 1/133634 349/98 |
| 2012/0188467 | A1* | 7/2012 | Escuti ................... G02F 1/1347 349/1 |
| 2016/0047956 | A1 | 2/2016 | Tabirian et al. |
| 2017/0010488 | A1 | 1/2017 | Klug et al. |
| 2017/0115491 | A1* | 4/2017 | Shi ...................... G02B 27/0176 |
| 2018/0129018 | A1* | 5/2018 | Cheng ................. G02B 27/286 |
| 2018/0210222 | A1 | 7/2018 | Seo et al. |
| 2018/0239177 | A1 | 8/2018 | Oh |
| 2018/0275410 | A1 | 9/2018 | Yeoh et al. |
| 2018/0284464 | A1 | 10/2018 | Lu et al. |
| 2018/0292653 | A1* | 10/2018 | Tervo ................. G02B 27/0081 |
| 2019/0075281 | A1 | 3/2019 | Hall et al. |
| 2019/0124152 | A1 | 4/2019 | Iasi et al. |
| 2020/0249626 | A1 | 8/2020 | Bouchal et al. |

FOREIGN PATENT DOCUMENTS

| | | |
|---|---|---|
| WO | WO2008/004692 A1 | 1/2008 |
| WO | WO2011/014743 A2 | 2/2011 |
| WO | WO2016/154537 A1 | 9/2016 |
| WO | WO2018/231784 A1 | 12/2018 |

OTHER PUBLICATIONS

C. Yousefzadeh, Afsoon Jamali, et. al. "Achromatic limits" of Pancharatnam Phase Lenses, Applied Optics 57(5) ,2018.
Caputo et al. "POLICRYPS Composite Materials: Features and Applications", In Advances in Composite Materials—1\nalysis of Natural and Man-Made Materials, Pavla Tesinova ed., 2011, DOI: 10.5772/17137, available at https:/lwww.ntechopen.com/books/advances-in-composite-materials-analysis-of-natural-and-man-made-materials/policryps-composite-materials-features-and-applications, 28 pages.
Cheng et al., "Concept for a transmissive, large angle, light steering device with high efficiency", vol. 40, Issue 9, pp. hllps://doi.org/10.1364/0L.40.002080, May 1, 2015, pp. 2080-2083.
Crawford, Gregory P. "Electrically Switchable BRAGG GRATINGS", Optics & Pholonics News, Apr. 2003, pp. 54-59.
Doane, William J., "Polymer-Dispersed Liquid Crystals: Boojums at Work." MRS Bulletin, vol. 16, Jan. 1991, 10.1557/S0883769400057869, pp. 22-28.
Facebook Technologies LLC, International Search Report and Written Opinion, PCT/US2019/062751, dated Feb. 12, 2020, 13 pgs.
Facebook Technologies LLC, International Search Report and Written Opinion, PCT/US2019/063552, dated Mar. 6, 2020, 10 pgs.
Gao et al., "High-efficiency large-angle Pancharalnam phase deflector based on dual-twist design", vol. 25, Issue 6, nttps://doi.org/10.1364/0E.25.006283, Mar. 20, 2017, pp. 6283-6293.
Geometric Phase Lenses with Color Selective Fillers {"GPL+CS"), lmagineOptix, Available at hllps://www. magineoptix.com/coming-soon-chromalic-aberralion-correction-geomelric-phase-lenses-red-green-blue-operalion/, May 2, 2017, 3 pages.
Guanjun Tan et al., "Foveated imaging for near-eye displays," Optics Express, vol. 26, No. 19, Sep. 11, 2018, p. 25076, XP055525627, DOI: 10.1364/0E.26.025076.
Lam, Office Action, U.S. Appl. No. 16/006,706, dated Jun. 12, 2020, 12 pgs.
Liu et al., "Generation of perfect vortex and vector beams based on Pancharalnam-Berry phase elements," Mar. 9, J017, Nature, www.nature.com/scienlificreports, 8 pages.
Liu et al., "Holographic Polymer-Dispersed Liquid Crystals: Materials, Formation, and Applications," Advances in OptoElectronics, vol. 2008, Article ID 684349, 2008, doi:10.1155/2008/684349, 53 pages.
L1N et al., "Retinal projection head-mounted display", hllps://link.springer.com/article/10.1007/s12200-016-0662-8, Oct. 15, 2016, 8 pages.
Maimone et al., "Holographic near-eye displays for virtual and augmented reality", ACM Transactions on Graphics, vol. 36, No. 4, Article 85, Jul. 2017, 16 pages.
McManamon et al., "A Review of Phased Array Steering for Narrow-Band Electrooptical System", Proceeding of EEE, vol. 97, No. 6, Jun. 2009, pp. 1078-1096.
Moheghi, Alireza "Le/Polymer Composites, Scattering Properties and Application in Displays", PhD dissertation, Ken State University, May 2017, 130 pages.
Shen S, She J, Tao T., "Optimal design of achromatic true zero-order waveplates using twisted nematic liquid crystal", J Opt Soc Am A Opt Image Sci Vis. May 2005;22(5):961-5.).
Shibata et al. "The zone of comfort: Predicting visual discomfort with stereo displays". Journal of Vision, 2011, 53 pages.
Soto, Pedro Coutino," Modeling and Characterization of Dye-Doped Guest-Host Liquid Crystal Eyewear", PhD dissertation, Kent State University, Nov. 2015, 149 pages.
Tae-Hoon Yoon, Gi-Dong Lee, and Jae Chang Kim, "Nontwist quarter-wave liquid-crystal cell for a high-contrast reflective display," Opt. Lett. 25, 1547-1549 (2000).
Tao Zhan et al., "High-resolution additive light field near-eye display by switchable Pancharatnam-Berry phase lenses", Optics Express, vol. 26, No. 4, Feb. 15, 2018 (Feb. 15, 2018), p. 4863, DOI: 10.1364/0E. 26.004863.
Uchiyama and T. Yatabe, "Wide-band retardation films with reverse wavelength dispersion," in Proceedings of the 7th International Display Workshop (Society for Information Display, 2000), pp. 407-410.—I haven't been able to obtain this reference yet.
Wang et al., "Finite Difference Time-Domain Simulation of a Liquid Crystal Optical Phased Array", Journal of the Optical Society of America, vol. 22, No. 2, Feb. 2005, pp. 346-354.
Yachao Liu, Yougang Ke, Junxiao Zhou, Yuanyuan Liu, Hailu Luo, Shuangchun Wen & Dianyuan Fan, "Generation of perfect vortex and vector beams based on Pancharatnam-Berry phase elements," Mar. 9, 2017, Nature.
Jamali, Office Action, U.S. Appl. No. 16/355,612, dated Dec. 9, 2020, 16 pgs.
Lam, Office Action, U.S. Appl. No. 16/006,706, dated Feb. 5, 2021, 16 pgs.
Lam, Office Action, U.S. Appl. No. 16/006,701, dated Jan. 11, 2021, 12 pgs.
Anonymous: Geometric Phase Lenses with Color Selective Filters ("GPL+CS"), ImagineOPtix, May 2, 2017, downloaded from https://

(56) References Cited

OTHER PUBLICATIONS imagineoptix.com/coming-soon-chromatic-aberration-correction-geometric-phase-lenses-red-green-blue-operation, 3 pgs.
Facebook Technologies LLC, International Search Report and Written Opinion, PCT/US2019/022334, dated May 31, 2019, 11 pgs.
Facebook Technologies LLC, International Preliminary Report on Patentability, PCT/US2019/022334, dated Sep. 15, 2020, 7 pgs.
Facebook Technologies LLC, International Search Report and Written Opinion, PCT/US2019/022147, dated Jun. 3, 2019, 11 pgs.
Facebook Technologies LLC, International Preliminary Report on Patentability, PCT/US2019/022147, dated Sep. 15, 2020, 7 pgs.
Jamali, Notice of Allowance, U.S. Appl. No. 16/355,612, dated Apr. 26, 2021, 8 pgs.

* cited by examiner

POLARIZATION-SENSITIVE COMPONENTS IN OPTICAL SYSTEMS FOR LARGE PUPIL ACCEPTANCE ANGLES

CROSS REFERENCE TO RELATED APPLICATIONS

This application claims the benefit of, and priority to, U.S. Provisional Patent Application Ser. No. 62/643,691, filed Mar. 15, 2018 and U.S. Provisional Patent Application Ser. No. 62/772,598, filed Nov. 28, 2018. This application is related to U.S. patent application Ser. No. 16/006,701, filed Jun. 12, 2018, and U.S. patent application Ser. No. 16/006,706, filed Jun. 12, 2018. All of these applications are incorporated by reference herein in their entireties.

BACKGROUND

Field of the Various Embodiments

Embodiments of this disclosure relate generally to near-eye displays and, more specifically, to an optical system using polarization-sensitive components and an eye tracking module to allow the optical system to steer an image beam to an eye of a user of the near-eye display.

Description of the Related Art

Near-eye displays (NED) are gaining popularity in recent years as means for providing virtual reality, augmented reality, and mixed reality content to users. Compact and light-weighted near-eye displays are expected to lead to a wider adoption of near-eye displays.

SUMMARY

Accordingly, there is a need for compact and light-weighted near-eye displays. The optical systems and methods disclosed in this application enable compact and light-weighted near-eye displays.

In accordance with some embodiments, an optical system includes an eye tracking module configured to determine eye position information; a control module configured to determine a first direction for steering light based on the eye position information; and a first optical module including a polarization-sensitive element configured to direct light incident on the first optical module into the first direction.

In accordance with some embodiments, a near-eye display device includes an image source configured to generate image light; an eye tracking module configured to determine eye position information; and an optical module configured to direct the image light to a first direction associated with the eye position information.

In accordance with some embodiments, a method includes determining an eye position associated with an eye to which an image is to be presented; determining, based, at least in part, on the eye position, a steer direction for directing image light associated with the image toward the eye; and transmitting an electronic signal corresponding to the steer direction to an optical module configured to direct the image light into the steer direction.

In accordance with some embodiments, an optical system includes a first optical module configured to direct real-world light incident on the first optical module in a first direction determined based, at least in part, on eye position information; a second optical module configured to direct image light incident on the second module in a second direction determined based, at least in part, on the eye position information; and an optical module disposed between the first optical module and the second optical module and configured to transmit the real-world light incident on the optical module toward the second optical module and to direct the image light toward the second optical module.

In accordance with some embodiments, a near-eye display device includes an image source configured to generate image light; an eye tracking module configured to determine eye position information; and a first optical module configured to direct real-world light incident on the first optical module in a first direction determined based, at least in part, on the eye position information; and a second optical module configured to direct the image light incident on the second module in a second direction determined based, at least in part, on the eye position information.

In accordance with some embodiments, an optical system includes an eye tracking module configured to determine eye position information; a first optical module configured to direct real-world light incident on the first optical module in a first direction determined based, at least in part, on the eye position information; and a second optical module configured to direct image light incident on the second module in a second direction determined based, at least in part, on the eye position information.

In accordance with some embodiments, an optical system includes an eye tracking module configured to determine eye position information; a control module configured to determine a first direction for steering light based on the eye position information; and an optical module that includes a polarization volume grating configured to direct into the first direction at least a first portion of light having a first polarization.

In accordance with some embodiments, a method includes determining an eye position associated with an eye to which an image is to be presented; determining, based, at least in part, on the eye position, a steer direction for directing image light associated with the image toward the eye; and transmitting at a first time a first electronic signal corresponding to the steer direction to a polarization volume grating configured to direct the image light into the steer direction.

In accordance with some embodiments, an optical system includes an eye tracking module configured to determine eye position information; a control module configured to determine a first direction for steering light based on the eye position information; and an optical module that includes an optical phased array configured to direct light incident on the optical phased array into the first direction.

In accordance with some embodiments, a method includes determining an eye position associated with an eye to which an image is to be presented; determining, based, at least in part, on the eye position, a steer direction for directing image light associated with the image toward the eye; and transmitting at a first time a first electronic signal corresponding to the steer direction to an optical phased array configured to direct the image light into the steer direction.

In accordance with some embodiments, a near-eye display device includes any optical system described herein.

BRIEF DESCRIPTION OF THE DRAWINGS

So that the manner in which the above recited features of the various embodiments can be understood in detail, a more particular description of the disclosed concepts, briefly sum

DETAILED DESCRIPTION

Figure 1A:
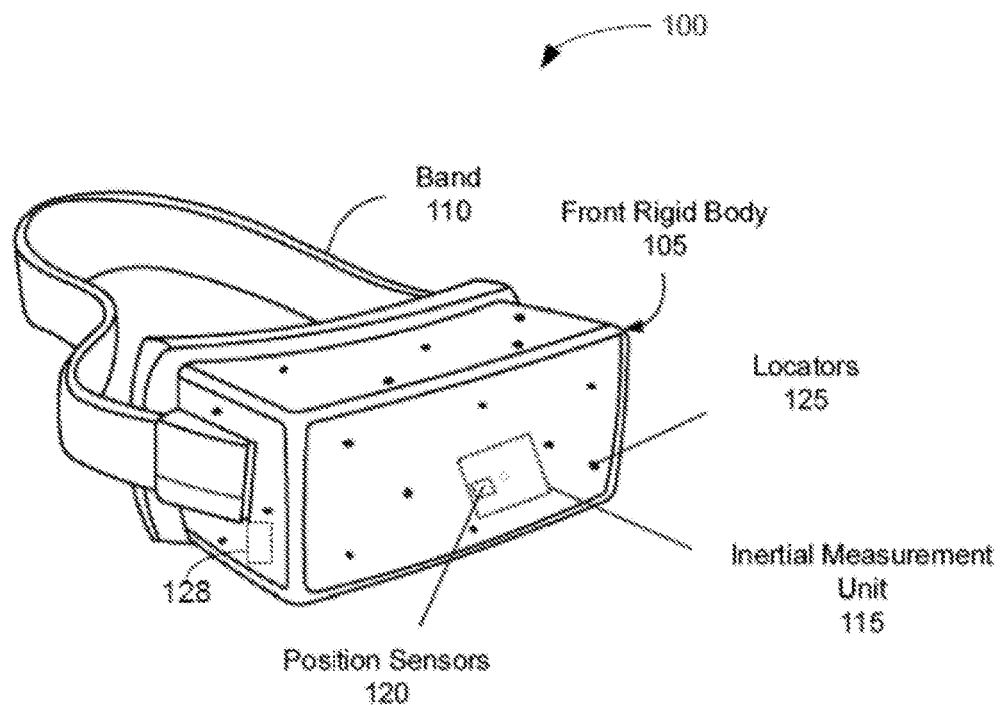
- FIG. 1A is a diagram of a near eye display (NED), according to some embodiments.

In the following description, numerous specific details are set forth to provide a more thorough understanding of the various embodiments. However, it will be apparent to one of skilled in the art that the disclosed concepts may be practiced without one or more of these specific details.

Configuration Overview

One or more embodiments disclosed herein relate to a near-eye display (NED) that includes an electronic display configured to output image light. Further, the NED includes an eye tracking module and one or more optical modules that are combined to form an optical system that allows for directing image light depending on changes in position of one or both eyes of a user of the NED. Various types of such optical modules, which may have switchable optical states, may be used to steer a light beam toward the user's eye. A direction of the steering may be based on eye position information determined by the eye tracking module. Such a system allows for pupil steering without moving parts.

In various examples, the optical module includes one or more polarization-sensitive elements configured to steer image light. The near-eye display may further comprise a control module configured to selectively control a subset of the polarization-sensitive elements based on a desired angle for steering light incident on the polarization-sensitive grating module. In some examples, the eye tracking module may generate (a value for) a gaze angle of an eye, which corresponds to the desired angle.

In various examples, the optical module includes one or more polarization-sensitive gratings that can be controlled to direct image light. In some examples, the polarization-sensitive gratings are created using liquid-crystal (LC) elements. In some configurations, a polarization-sensitive element may comprise metamaterial with meta-structure configured to change the geometric phase of display light.

In various examples, the one or more polarization-sensitive elements are selected from a group consisting of polarized volume gratings (PVGs), Switchable Bragg Gratings (SBGs), Pancharatnam Berry Phase (PBP) elements, Optical Phased Arrays (OPAs), or any combinations thereof.

In some embodiments, multiple polarization-sensitive elements, each associated with a different color channel, together form a polarization-sensitive structure (e.g., a polarization-sensitive stack), such as a grating structure or a lens structure. For an optical module that includes one or more PBP elements, each of the PBP element included in the polarization-sensitive structure may be configured to operate as a half-wave plate for a respective color channel, while operating as a full-wave plate (e.g., introducing no phase change) for other color channels. For a PBP grating structure, each of the PBP element included in the grating structure is configured such that light within a respective color channel is diffracted to a common angle. For a PBP lens structure, each of the PBP lenses included in the lens structure is configured such that light within a respective color channel is focused to a point that is common for all the color channels. The color-corrected lenses may be used in, for example, an optical element in a head-mounted display.

Color-corrected lenses may be useful to deal with vergence-accommodation conflict in artificial reality environments.

For ease of discussion, the following description involves three color channels, each having a representative (e.g., central) wavelength. A color channel, however, may comprise a continuous spectrum of wavelengths. To simplify descriptions herein, the description of a continuous spectrum is omitted and, instead, a representative wavelength within the associated color channel is considered. For example, the red color channel may be represented by wavelength of 630 nanometers, the green color channel may be represented by wavelength of 530 nanometers, and the blue color channel may be represented by wavelength of 490 nanometers, though the scope of the disclosure and the claims is not so limited.

In some embodiments, an optical system includes one or more optical elements (e.g., one or more optical modules), a control module configured to provide an electronic signal to the one or more optical elements, and an eye tracking module to provide eye position information to the control module. The optical system may be implemented in a head-mounted display (HMD) and/or a NED to relocate the position of the exit pupil of the optical system.

Embodiments of the present disclosure may include or be implemented in conjunction with an artificial reality system. Artificial reality is a form of reality that has been adjusted in some manner before presentation to a user, which may include, for example, a virtual reality (VR) system, an augmented reality (AR) system, a mixed reality (MR) system, a hybrid reality system, or some combination and/or derivatives thereof. Artificial reality content may include, without limitation, completely generated content or generated content combined with captured (e.g., real-world) content. The artificial reality content may include, without limitation, video, audio, haptic feedback, or some combination thereof. The artificial reality content may be presented in a single channel or in multiple channels (such as stereo video that produces a three-dimensional effect to the viewer). Additionally, in some embodiments, artificial reality systems may also be associated with applications, products, accessories, services, or some combination thereof, that are used to, e.g., create content in an artificial reality system and/or are otherwise used in (e.g., perform activities in) an artificial reality system. The artificial reality system may be implemented on various platforms, including a head-mounted display (HMD) coupled to a host computer system, a standalone HMD, a mobile device or computing system, or any other hardware platform capable of providing artificial reality content to one or more viewers.

System Overview

FIG. 1A is a diagram of a near eye display (NED) 100, according to some embodiments. NED 100 includes a front rigid body 105 and a band 110. Front rigid body 105 includes one or more electronic display elements of an electronic display (not shown), an inertial measurement unit (IMU) 115, one or more position sensors 120, and locators 125. In the embodiment illustrated in FIG. 1A, position sensors 120 are located within IMU 115, and neither IMU 115 nor position sensors 120 are visible to the user. IMU 115, position sensors 120, and locators 125 are discussed in detail below with regard to FIG. 22. In various embodiments, where NED 100 acts as an AR or MR device, portions of NED 100 and/or its internal components are at least partially transparent.

Figure 1B:
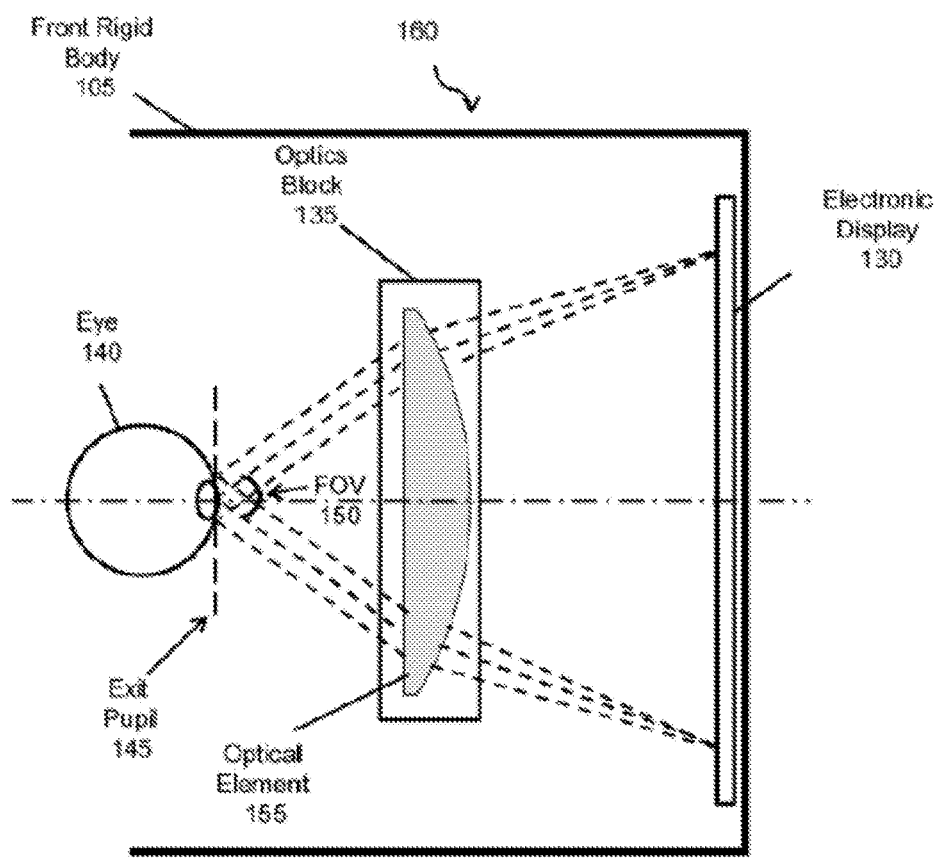
FIG. 1B is a cross section of the front rigid body of the embodiment of the NED illustrated in FIG. 1A.

FIG. 1B is a cross section 160 of front rigid body 105 of the embodiment of NED 100 illustrated in FIG. 1. Front rigid body 105 includes an electronic display 130 and an optics block 135 that together provide image light to an exit pupil 145. Exit pupil 145 is the location of the front rigid body 105 where a user's eye 140 may be positioned. For purposes of illustration, FIG. 1B illustrates a cross section 160 associated with a single eye 140, but another optics block, separate from optics block 135, may provide altered image light to another eye of the user. Additionally, NED 100 includes an eye tracking system 128. Eye tracking system 128 may include one or more sources that illuminate one or both eyes of the user and may include one or more cameras that capture images of one or both eyes of the user to track the positions of the eyes. Eye tracking system 128 may be located in any number of locations in NED 100, and claimed subject matter is not limited in this respect.

Electronic display 130 displays images to the user. In some embodiments, the electronic display 130 includes a pixelated light valve (e.g., an electronic display such as a liquid crystal display (LCD)). The pixelated light valve may be illuminated by a light source that may produce at least partially coherent light. In some examples, the system may be configured to operate with multiple color channels (e.g., three) for different portions of the visible spectrum (e.g., red, green, and blue color channels). In some implementations, the electronic display may be configured to emit image light that includes the multiple color channels. In other implementations, the system may include an electronic display for individual color channels. In various embodiments, electronic display 130 may comprise a single electronic display or multiple electronic displays (e.g., a display for each eye of a user). Examples of electronic display 130 include: a liquid crystal display (LCD), an organic light emitting diode (OLED) display, an active-matrix organic light-emitting diode display (AMOLED), a QOLED, a QLED, some other display, or some combination thereof.

Optics block 135 adjusts an orientation of image light emitted from electronic display 130 such that electronic display 130 appears at particular virtual image distances from the user. Optics block 135 is configured to receive image light emitted from electronic display 130 and direct the image light to an eye-box associated with exit pupil 145. The image light directed to the eye-box forms an image at a retina of eye 140. The eye-box is a region defining how much eye 140 moves up/down/left/right from without significant degradation in the image quality. In the illustration of FIG. 1B, a field of view (FOV) 150 is the extent of the observable world that is seen by eye 140 at any given moment.

Additionally, in some embodiments, optics block 135 magnifies received light, corrects optical errors associated with the image light, and presents the corrected image light to eye 140. Optics block 135 may include one or more optical elements 155 in optical series. An optical element 155 may be an aperture, a Fresnel lens, a convex lens, a concave lens, a filter, a waveguide, a PBP element, a color-selective filter, a waveplate, a C-plate, various types of polarizers, or any other suitable optical element 155 that affects the image light. Moreover, optics block 135 may include combinations of different optical elements. In some embodiments, one or more of the optical elements in optics block 135 may have one or more coatings, such as anti-reflective coatings. Optics block 135 may include components that are discussed in detail in conjunction with FIGS. 4-22.

Figure 2:
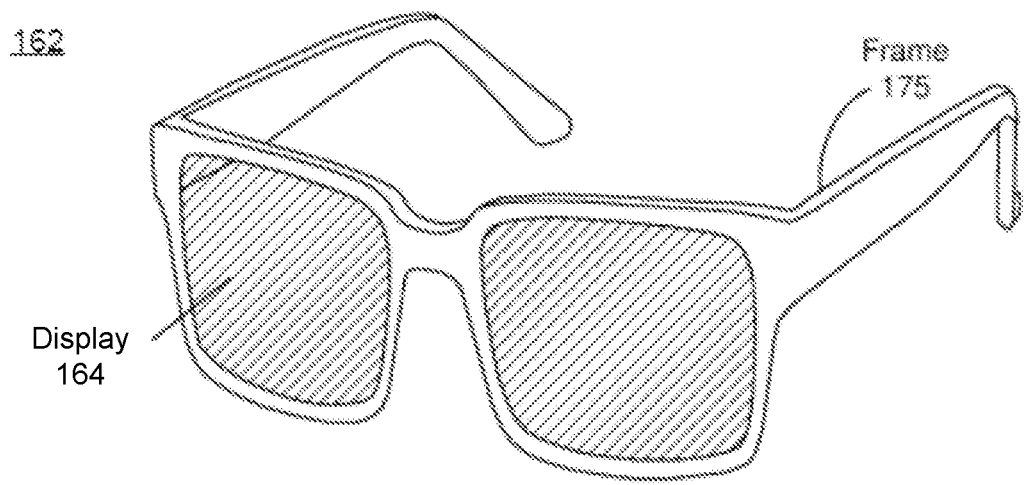
FIG. 2 is a diagram of a head-mounted display (HMD) implemented as a near eye display, according to some embodiments.

FIG. 2 is a diagram of an NED 162 implemented as a near eye display, according to some embodiments. In this embodiment, NED 162 is in the form of a pair of augmented reality glasses. NED 162 presents computer-generated media to a user and augments views of a physical, real-world environment with the computer-generated media. Examples of computer-generated media presented by NED 162 include one or more images, video, audio, or some combination thereof. In some embodiments, audio is presented via an external device (e.g. speakers and headphones) that receives audio information from NED 162, a console (not shown), or both, and presents audio data based on audio information. In some embodiments, NED 162 may be modified to also operate as a virtual reality (VR) HMD, a mixed reality (MR) HMD, or some combination thereof. NED 162 includes a frame 175 and a display 164. In this embodiment, frame 175 mounts the near eye display to the user's head, while display 164 provides image light to the user. Display 164 may be customized to a variety of shapes and sizes to conform to different styles of eyeglass frames.

Figure 3:
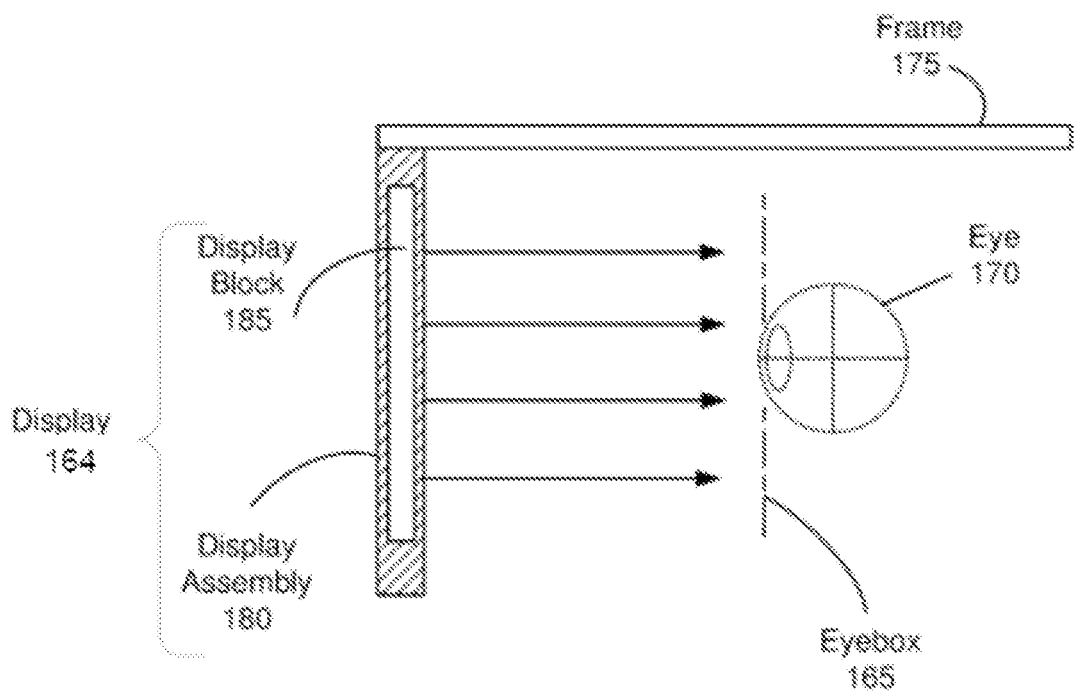
FIG. 3 is a cross-section view of an HMD of FIG. 2 implemented as a near eye display, according to some embodiments.

FIG. 3 is a cross-section view of NED 162 implemented as a near eye display, according to some embodiments. This view includes frame 175, display 164 (which comprises a display assembly 180 and a display block 185), and eye 170. The display assembly 180 supplies image light to eye 170. Display assembly 180 houses display block 185, which, in different embodiments, includes the different types of imaging optics and redirection structures. For purposes of illustration, FIG. 3 shows the cross section associated with a single display block 185 and a single eye 170, but in alternative embodiments not shown, another display block, which is separate from display block 185 shown in FIG. 3, provides image light to another eye of the user.

Display block 185 is configured to combine light from a local area with light from computer generated image to form an augmented scene. Display block 185 is also configured to provide the augmented scene to eyebox 165 corresponding to a location of a user's eye 170. Display block 185 may include, for example, a waveguide display, a focusing assembly, a compensation assembly, or some combination thereof. As described below for, polarization-sensitive structures may be placed on one or both sides of display block 185 to affect various parameters (e.g., focal length, optical power, image quality, and so on) of the optical system.

NED 162 may include one or more other optical elements between display block 185 and eye 170. The optical elements may act to, for example, correct aberrations in image light emitted from display block 185, magnify image light emitted from display block 185, some other optical adjustment of image light emitted from display block 185, or some combination thereof. Example optical elements may include an aperture, a Fresnel lens, a convex lens, a concave lens, a filter, or any other suitable optical element that affects image light. Display block 185 may comprise one or more materials (e.g., plastic, glass, etc.) with one or more refractive indices that effectively minimize the weight and widen a field of view of NED 162. In some embodiments, one or more components of display block 185 are implemented as a structure having a stack of polarization-sensitive layers, which are described in greater detail below.

Switchable Optical Module for Pupil Steering

Figure 4:
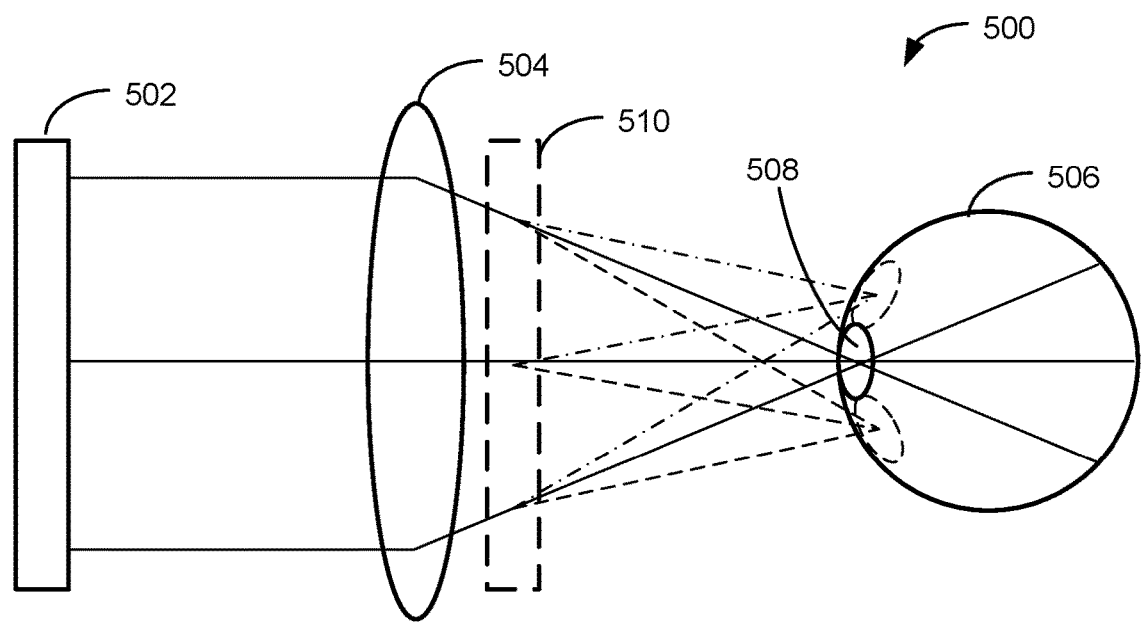
FIG. 4 illustrates an optical system with a large pupil size retinal projection in accordance with some embodiments.

FIG. 4 illustrates an optical system 500 with a large pupil size retinal projection in accordance with some embodiments.

The optical system (e.g., a pupil projection optical system) includes an electronic display 502 and one or more optical elements 504 configured to project an image directly on a retina of an eye 506. The optical system typically has a small exit pupil, which allows a large field of view and an extended focal range. Because the etendue of the system is limited, the optical system can use compact optics. In addition, the optical system can use optical components with small etendue, such as laser scanning devices. However, because of the small exit pupil, the optical system can successfully project the image on the retina of the eye 506 when the pupil 508 of the eye 506 is located in position (e.g., on axis), but the projected image is blocked (e.g., by sclera) when the pupil 508 of the eye 506 is located off (e.g., due to a rotation of the eye 506 or a movement of the head). Thus, in some embodiments described herein, the optical system includes an optical module 510 for steering the image.

Figure 5:
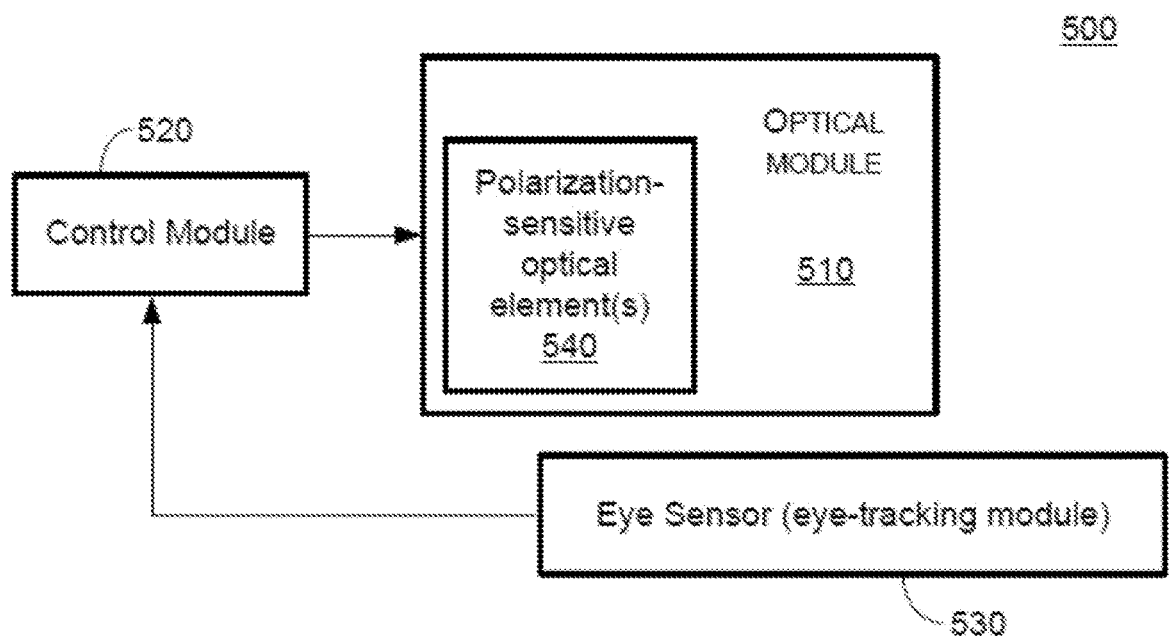
FIG. 5 is a block diagram of an optical system having optical parameters that are switchable in response to eye tracking information, according to some embodiments.

FIG. 5 is a block diagram of the optical system 500 according to some embodiments. The optical system 500 may be incorporated in a number of embodiments described below, for example. In addition to the optical module 510, the optical system 500 also includes an electronic control module 520 and an eye tracking module 530, similar to or the same as 128 illustrated in FIG. 1. The optical module 510 has switchable optical parameters, switching of which causes steering of light. The electronic control module 520 is configured to switch the optical parameters of the optical module 510 in response to eye tracking by the eye tracking module 530. For example, eye tracking module 530 may be configured to measure orientation, position, and/or location of one or both eyes of a user of a NED, for example. Such measurements may be provided as eye position information to control module 520. In turn, control module 520 may be configured to provide electronic signals to the optical module 510 to selectively control a steer direction (among other things) of image light incident on polarization-sensitive optical elements 540.

Optical module 510 includes polarization-sensitive optical elements 540, such as one or more of switchable Bragg gratings (SBG), PBP optical elements (e.g., PBP gratings), polarization volume gratings (PVG), and optical phased arrays (OPA), various types of wave plates, and polarizers, just to name a few examples.

FIGS. 6-13B illustrate different types of polarization-sensitive optical elements such as, for example, PBP optical elements (e.g., PBP gratings), switchable Bragg gratings (SBGs), polarized volume gratings (PVGs), active and passive Pancharatnam Berry Phase (PBP) elements, variable pitch LC grating (e.g., optical phased arrays (OPAs)). Light incident on a polarization-sensitive element may be modified in a way that is particular to the type of polarization-sensitive element and the characteristics of the light, such as the type of polarization, wavelength, and angle of incidence of the light, just to name a few examples. FIGS. 17A-21 illustrate a number of example optical system configurations that involve one or more polarization-sensitive elements of various types. Such systems may be included in, for example, near-eye display device for VR, AR, or MR.

Figure 6:
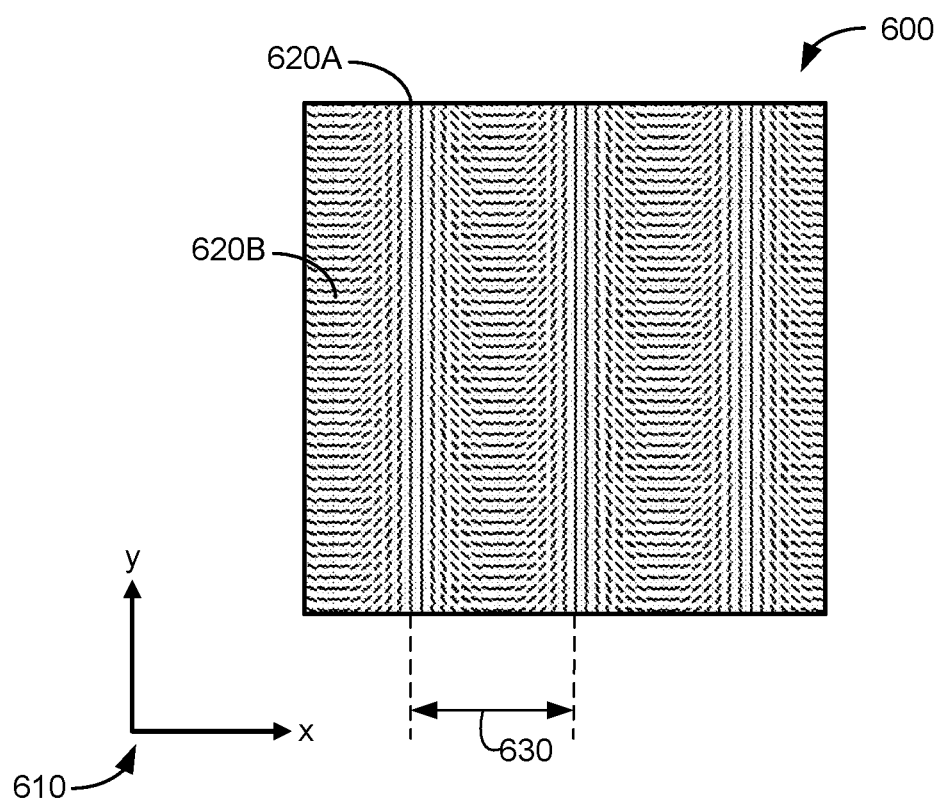
FIG. 6 illustrates an example of a Pancharatnam Berry Phase (PBP) liquid crystal grating, according to some embodiments.

FIG. 6 illustrates a PBP grating 600, according to various embodiments. Mutually orthogonal x and y-axes 610 are illustrated for reference. The z-axis, not illustrated, is perpendicular to the x-y plane and corresponds to an optical axis of grating 600.

In some examples, grating 600 includes liquid crystals 620 that are oriented in a linearly repetitive pattern. In FIG. 6, the liquid crystals (or meta-structures) are illustrated as short line segments aligned so as to schematically represent orientations of the liquid crystals. For example, liquid crystal 620A is oriented in the y-direction while liquid crystal 620B is oriented in the x-direction. Liquid crystals between 620A and 620B are aligned along directions intermediate to the x and y-directions (e.g., at a slanted angle with respect to the x and y-directions). The liquid crystals having such a patterned orientation give rise to a geometric-phase shift of light as a consequence of polarization evolution as the light propagate through the liquid crystals. In various embodiments, orientations of the liquid crystals along the x-axis are constant for a particular x-y plane of grating 600. Further, though not illustrated, in various embodiments, orientations of the liquid crystals in a direction perpendicular to the x-y plane (the z-axis) may vary in a rotational fashion (e.g., a twisted structure).

The linearly repetitive pattern of grating 600 has a pitch that is the distance 630 along the x-axis between repeated portions of the pattern. The pitch determines, in part, the optical properties of grating 600. For example, polarized light incident along the optical axis on grating 600 results in a grating output comprising primary, conjugate, and leakage light respectively corresponding to diffraction orders m=+1, −1, and zero. Although m=+1 is herein considered to be the primary order and the conjugate order is considered to be the m=−1 order, the designation of the orders could be reversed or otherwise changed. The pitch determines the angles (e.g., beam-steering angles) of the light in the different diffraction orders. Generally, the smaller the pitch, the larger the angles for a given wavelength of light.

In some embodiments, PBP elements, such as PBP grating 600, may be active (also referred to as an "active element") or passive (also referred to as a "passive element").

Figure 7:
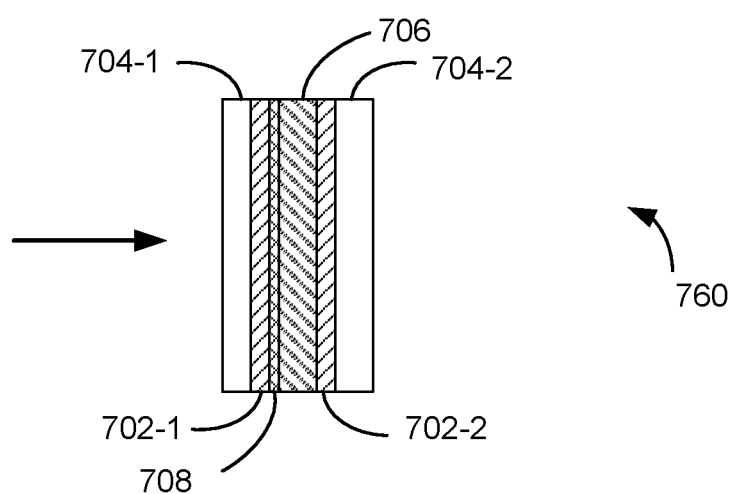
FIG. 7 illustrates an example active PBP element in accordance with some embodiments.

FIG. 7 illustrates an example active PBP element 760 in accordance with some embodiments. The active PBP element 760 includes a plurality of electrodes 702-1 and 702-2, which may be implemented as indium tin oxide (ITO) electrodes located on substrates (e.g., transparent substrates, such as glass substrates) 704-1 and 704-2. Located between the electrodes 702-1 and 702-2 is a layer 706 of liquid crystals. At least one of the substrates 704-1 and 704-2 includes a surface alignment layer 708 with a predefined surface pattern (e.g., the surface pattern shown in FIG. 6). The surface pattern on the surface alignment layer 708 allows liquid crystals to self-align in the same pattern when no voltage is applied to the active PBP element.

An active PBP element has two optical states: an "on" state and an "off" state. In some embodiments, the state of an active PBP element is determined by a measure of the voltage applied to the active PBP element.

This "off" state allows the active PBP element to provide diffraction (e.g., the intensity of the diffracted light is stronger than the intensity of any transmitted light without diffraction). When a voltage above a predefined threshold is applied, the liquid crystals are aligned in a direction along an electric field created by the applied voltage, and thus, the liquid crystals no longer remain aligned to the surface pattern. This "on" state allows the active PBP element to transmit light without diffraction (e.g., the intensity of the transmitted light is stronger than the intensity of any diffracted light).

When the active PBP element is in the off state, light output from the active PBP element has a handedness that is opposite to the handedness of light input into the active PBP element. In contrast, When the active PBP element is in the on state, light output from the active PBP element has the same handedness as the light input into the active PBP element.

When the PBP element is implemented as an active PBP grating, the active PBP grating conditionally diffracts light of a particular wavelength based on the polarization of the light. For example, when no voltage (or a voltage below a threshold voltage value) is applied to the active PBP grating (so that the active PBP grating is in the "off" state), the active PBP grating with certain handedness diffracts incident light with a right-handed circular polarization in a first direction (e.g., the direction of a +1 diffraction order) and diffracts incident light with a left-handed circular polarization in a second direction (e.g., the direction of a −1 diffraction order). If the PBP grating is flipped (so that the handedness of in-plane structures is reversed), the flipped PBP grating may diffract the incident light with a right-handed circular polarization in the second direction (e.g., the direction of the −1 diffraction order) and diffract the incident light with the left-handed circular polarization in the first direction (e.g., the direction of the +1 diffraction order). When a voltage greater than the threshold voltage value is applied to the PBP grating, the PBP grating causes no diffraction of the light (regardless of the polarization of the light).

In some embodiments, a passive PBP element has liquid crystals arranged in a predefined pattern (e.g., the pattern shown in FIG. 6), regardless of the voltage applied thereto. The passive PBP element may operate as a corresponding active PBP element in the "off" state. For example, when the passive PBP element is implemented as a passive PBP grating, the passive PBP grating operates in a similar manner as an active PBP grating in the "off" state. In general, a passive PBP element outputs light that has a handedness that is opposite of the light input into the passive PBP element.

Figure 8A:
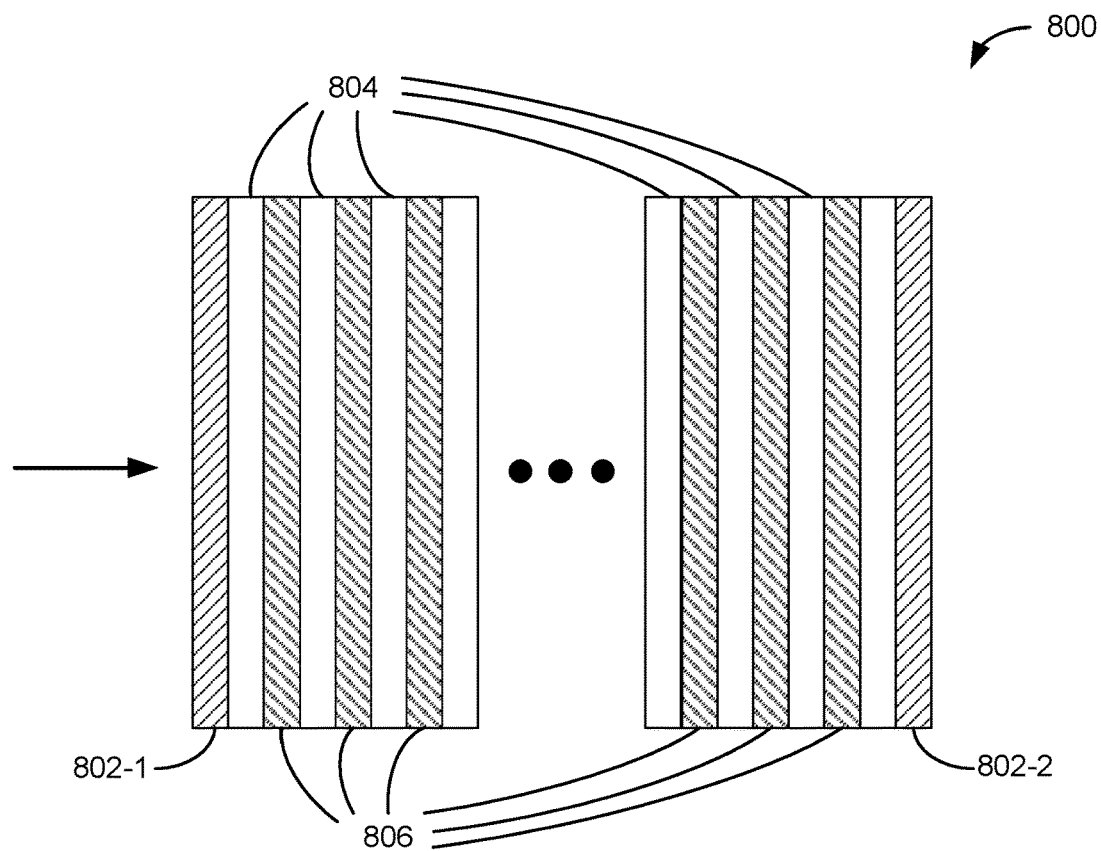
FIG. 8A illustrates an example switchable Bragg grating in accordance with some embodiments.

FIG. 8A illustrates an example switchable Bragg grating (SBG) 800 in accordance with some embodiments. The SBG 800 includes a plurality of electrodes 802-1 and 802-2, which may be implemented as indium tin oxide (ITO) electrodes located on transparent substrates (e.g., glass substrates). Between the electrodes 802-1 and 802-2 are one or more layers 804 of a fixed refractive index and one or more layers 806 of an adjustable refractive index (e.g., one or more layers of liquid crystals). When a voltage (above a threshold voltage value) is applied between the electrodes 802-1 and 802-2, the liquid crystals in the one or more layers 806 have a refractive index that is different from the refractive index of the liquid crystals. When the refractive index of the liquid crystals differs from the refractive index of the one or more layers 804, the alternating layers of different refractive index values serve as a Bragg grating. When the refractive index of the liquid crystals matches the refractive index of the one or more layers 804, the one or more layers 804 and the one or more layers 806 cease to operate as a Bragg grating.

Although FIG. 8A shows that the one or more layers 804 and the one or more layers 806 have the same thickness, in some embodiments, each layer of the one or more layers 804 has a first thickness and each layer of the one or more layers 806 has a second thickness distinct from the first thickness.

Alternatively, the SBG 800 may be formed by curing a combination of monomer and liquid crystal in a free-standing cell or waveguide with two interfering coherent laser beams to polymerize the mixture. This leads to alternating portions of solid polymer and liquid-crystal droplets having different indices. By adjusting the direction of the two interfering coherent laser beams, the direction of the diffraction can be selected. Because this method allows forming multiple regions of different refractive index values in a single layer, this configuration may be implemented with only a single layer 806 of liquid crystals.

Figure 8B:
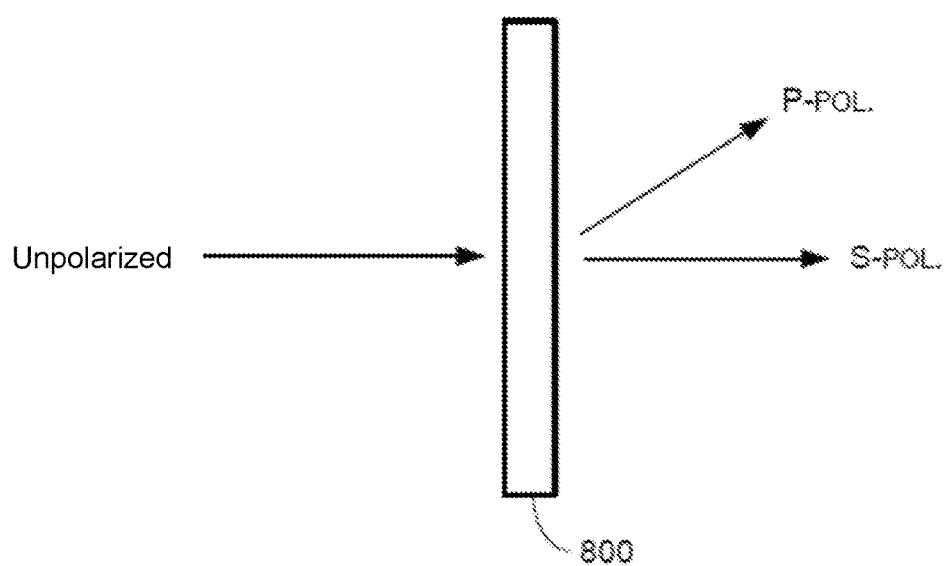
FIG. 8B illustrates example optical paths through a switchable Bragg grating, according to some embodiments.

FIG. 8B illustrates example optical paths for light passing through the SBG 800, according to some embodiments. The SBG may be configured to modify light traveling through the SBG based, at least in part, on the characteristics of the light, such as the type of polarization, wavelength, and angle of incidence of the light. For example, SBGs may be configured to operate selectively based on a polarization of the light. When unpolarized light is incident on, and transmitted through, SBG 800, the unpolarized light can be considered as a combination of S-polarized light and P-polarized light. The SBG 800 can be configured (e.g., by applying no electric field or an electric field lower than threshold to the SBG 800) to diffract the P-polarized light to a particular angle while most of the S-polarized light is transmitted without diffraction. In such a configuration, the SBG 800 operates as a grating for P-polarized light, but not as a grating for S-polarized light. In some cases, the SBG 800 is configured (e.g., by applying an electric field above the threshold to the SBG 800), both the S-polarized light and the P-polarized light are transmitted through the SBG 800 without diffraction.

Figure 9:
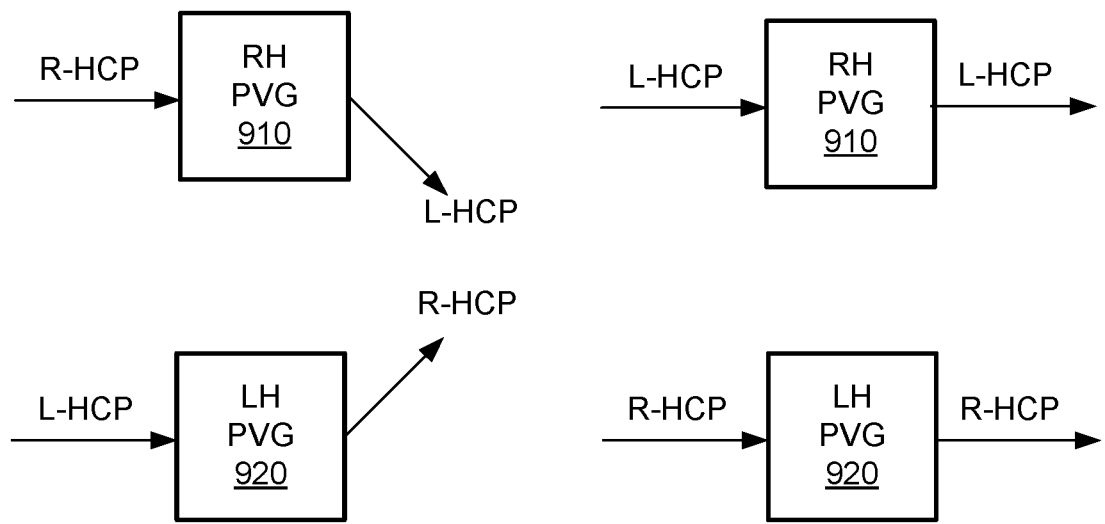
FIG. 9 illustrates example optical paths through a polarization volume grating, according to some embodiments.

FIG. 9 illustrates example optical paths through various polarization volume gratings (PVGs), according to several embodiments. PVGs may comprise liquid crystals having a formed modulation of the optic axis, may comprise a liquid crystal polymer with photo-alignment materials, or may comprise patterned birefringent nanostructures, just to name a few examples. PVGs can operate in a reflective mode and a transmissive mode, and may act as polarization-selective gratings. In some embodiments, a PVG may comprise a stack of layers of switchable PVGs. Such a stack may include two or more layers, as described in detail below.

In some embodiments, a PVG includes liquid crystal molecules that are arranged in helical patterns. As used herein, a PVG is called left-handed (LH) when the liquid crystal molecules are arranged in a counter-clockwise rotational pattern along the direction of light propagation, and a PVG is called right-handed (RH) when the liquid crystal molecules are arranged in a clockwise rotational pattern along the direction of light propagation. However, for a given direction of light propagation, a LH PVG can be flipped to serve as a RH PVG, and a RH PVG can be flipped to serve as a LH PVG. Thus, the designation of the LH PVG and the RH PVG is used herein to describe the interaction between the PVG and the input light, and not to describe different types of PVGs.

A LH PVG operates on light differently from a RH PVG. For example, upon receiving incident light having right hand circular polarization, RH PVG 910 diffracts the received light to a particular angle and changes the polarization of the light to the left hand circular polarization, and upon receiving light having left hand circular polarization, RH PVG 910 transmits most of the received light without diffraction (e.g., the RH PVG 910, upon receiving the incident light having right hand circular polarization, provides a diffracted light having a first intensity and a transmitted light having a second intensity that is less than the first intensity, and upon receiving the incident light having left hand circular polarization, provides a transmitted light having a third intensity and a diffracted light having a fourth intensity that is less than the third intensity), whereas upon receiving incident light having left hand circular polarization, LH PVG 920 diffracts the received light to a particular angle and changes the polarization of the light to the right hand circular polarization, and upon receiving incident light having right hand circular polarization, LH PVG 920 transmits most of the received light without diffraction (e.g., the LH PVG 920, upon receiving the incident light having left hand circular polarization, provides a diffracted light having a first intensity and a transmitted light having a second intensity that is less than the first intensity, and upon receiving the incident light having right hand circular polarization, provides a transmitted light having a third intensity and a diffracted light having a fourth intensity that is less than the third intensity).

In some embodiments, a PVG (e.g., 910 or 920) may be configured to redirect transmitted light if the light has a particular polarization and an angle of incidence greater than a threshold angle. On the other hand, the PVG may merely transmit the light with no redirecting if the light has another particular polarization or an angle of incidence less than the threshold angle. Because of such a dependency on a threshold angle (e.g., greater than about 15 degrees, though claimed subject matter is not limited in this respect), optical systems, in some embodiments, may involve light incident on a PVG with a relatively large bias angle.

In some embodiments, a PVG (e.g., 910 or 920) may comprise a stack of multiple layers of PVGs, each configured to be switched on or switched off. The stack may thus steer light by an angle that is based, at least in part, on which of the multiple layers of PVGs are switched on or switched off. Each of the layers may individually provide a discrete amount of steering, for example. For example, in order to generate a beam steering stack to steer a light beam by 10 degrees, a particular combination of layers of PVGs may be switched to an off-state. Such a combination may be, for instance, a first layer configured to steer the light beam by 2 degrees and a second layer configured to steer the light beam by 8 degrees. The combined effect on steering by these layers is a redirection of the light beam by 10 degrees.

Figure 10:
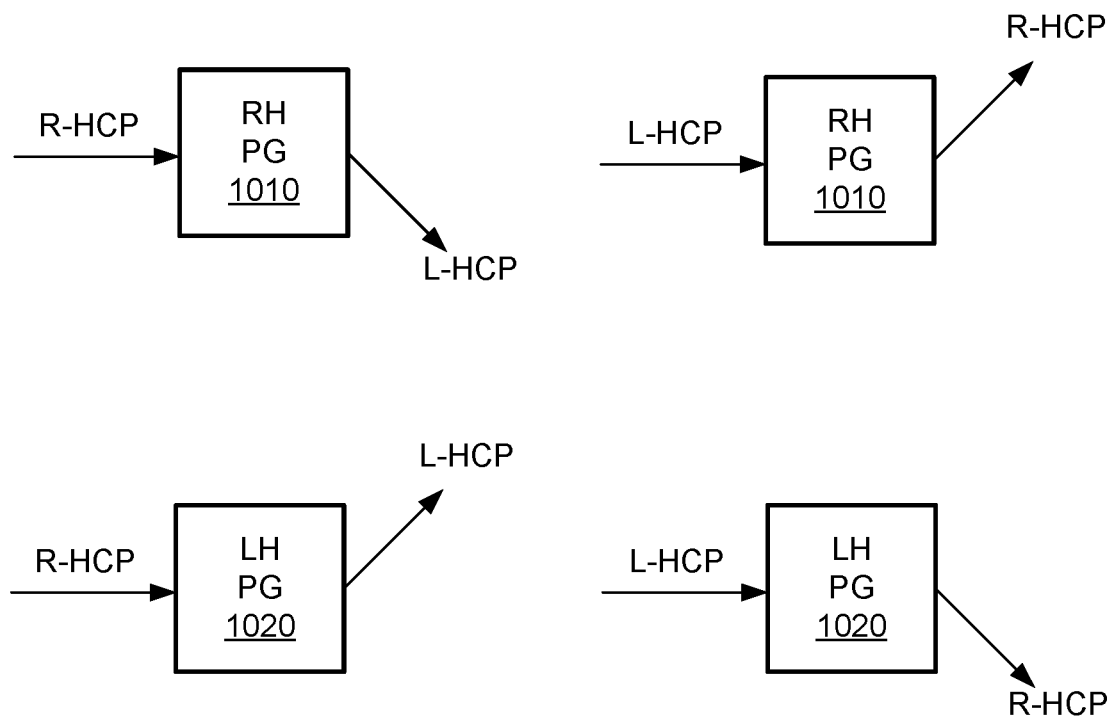
FIG. 10 illustrates example optical paths through a passive PBP grating, according to some embodiments.

FIG. 10 illustrates example optical paths through a passive PBP grating (PG), according to some embodiments.

As used herein, a PG is called left-handed (LH) or right-handed (RH) based on the rotational direction of the liquid crystal molecules in a reference direction (e.g., along the x-direction as shown in FIG. 6). However, a LH PG can be flipped to serve as a RH PG, and a RH PG can be flipped to serve as a LH PG. Thus, the designation of the LH PG or the RH PG is used herein to describe the interaction between the PG and the input light, and not to describe different types of PGs.

Referring back to FIG. 10, a LH PG operates on light differently from a RH PG. For example, upon receiving incident light having right hand circular polarization, RH PG 1010 diffracts the received light to a first angle and changes the polarization of the light to left hand circular polarization, and upon receiving incident light having left hand circular polarization, RH PG 1010 diffracts the received light to a second angle that has the same magnitude as the first angle and a sign that is opposite to the first angle. Upon receiving incident light having right hand circular polarization, LH PG 1020 diffracts the received light to a third angle and changes the polarization of the light to left hand circular polarization, and upon receiving incident light having the right hand circular polarization, LH PG 1020 diffracts the received light to a fourth angle that has the same magnitude as the third angle and a sign that is opposite to the third angle.

Figure 11:
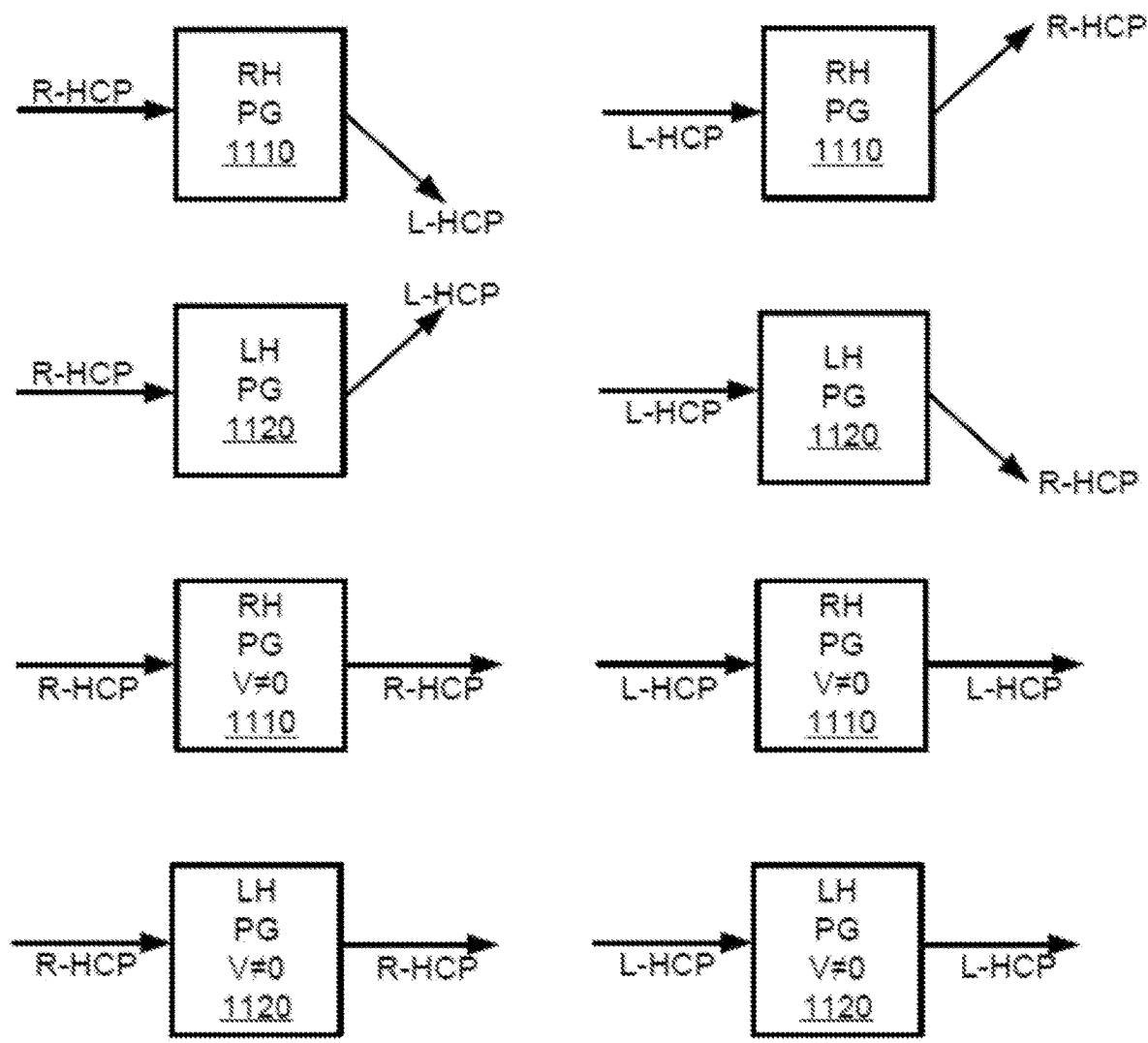
FIG. 11 illustrates example optical paths through an active PBP grating, according to some embodiments.

FIG. 11 illustrates example optical paths through an active PBP grating (PG), according to some embodiments. As described above with respect to FIG. 7, the PG can be configured as an active element. In some embodiments, when the PG is in the "off" state (so that the liquid crystals are arranged along a predefined surface pattern), the active PG operates like the passive PB described above with respect to FIG. 10. When the PG is in the "on" state (so that the liquid crystals cease to be arranged along the predefined surface pattern), the active PG operates like a window (e.g., the intensity of the transmitted light is stronger than the intensity of diffracted light, if any). Alternatively, the active PG may be configured (e.g., by using a bias voltage) so that when a certain voltage above the threshold voltage value is applied, the liquid crystals are arranged along the predefined surface pattern, and when no voltage is applied, the liquid crystals cease to be arranged along the predefined surface pattern.

Figure 12:
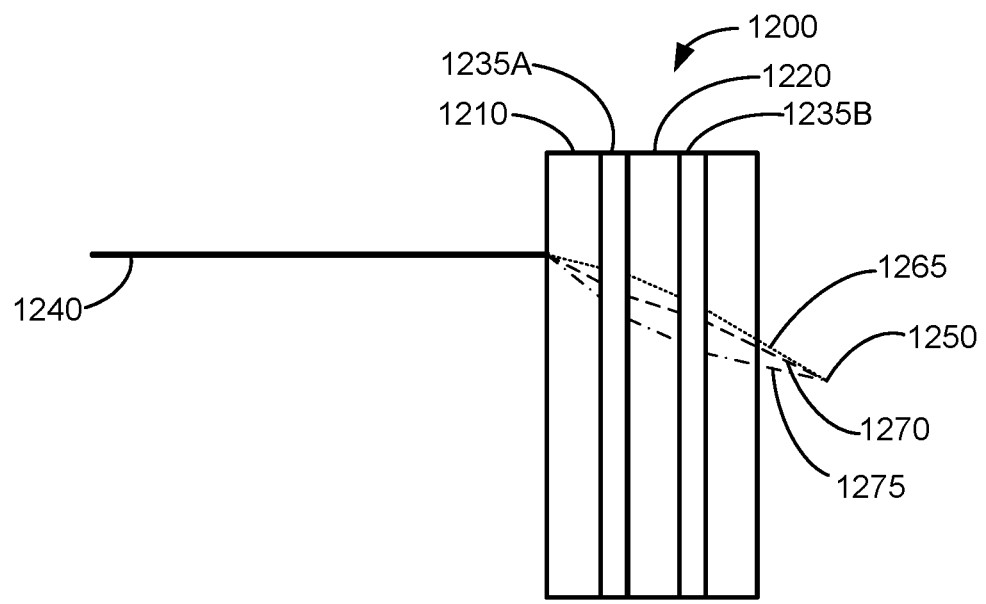
FIG. 12 illustrates a PBP grating module that includes color-selective filters.

FIG. 12 illustrates an example PBP liquid crystal grating module 1200 that includes color-selective filters. Grating module 1200 is configured to reduce or eliminate a problem that a grating module may otherwise have, wherein different wavelengths are diffracted into different directions. PBP grating module 1200 comprises a first PBP grating 1210, a second PBP grating 1220, and a third PBP grating 1230, each associated with a different color channel (e.g., red, green, and blue). PBP grating module 1200 also comprises color-selective filters 1235A and 1235B.

A color-selective filter is a multi-layer birefringent film that behaves as a half-wave plate for one color channel and a full-wave plate for other color channels. Generally, a half-wave plate reverses the handedness of polarized light (e.g., right-hand circularly polarized light becomes left-hand circularly polarized light upon transmitting through a half-wave plate, and vice versa). A full-wave plate does not impose such a change.

In some embodiments, first PBP grating 1210, second PBP grating 1220, and third PBP grating 1230 are configured to diffract left-hand circularly polarized light into the +1 order direction and to diffract right-hand circularly polarized light into the −1 direction. Moreover, the handedness of circularly polarized light switches (right to left and vice versa) upon travelling through the PBP gratings.

In various embodiments, placing color-selective filters among PBP gratings 1210, 1220, and 1230 allows for controlling the direction of the individual color channels as the associated light travels through the respective PBP gratings and color-selective filters. For example, input light 1240, which includes three color channels (e.g., red, green, and blue) transmits through first PBP grating 1210, which provides a wavelength-dependent diffraction. Accordingly, for light 1240 comprising red color channel 1265, green color channel 1270, and blue color channel 1275 that are all left circularly polarized, first PBP grating 1210 diffracts the red channel into a first direction, the green channel into a second direction, and the blue channel into a third direction (all in the +1 order direction for each color channel). The handedness of the three channels switches to right circularly polarized. Next, all three channels of light travel through color-selective filter 1235A. In this example, color-selective filter 1235A is configured to behave as a half-wave plate for the red channel and as a full-wave plate for the green and blue channels. Thus, color-selective filter 1235A changes the handedness of the red channel from right to left circularly polarized, while the handedness of the green and blue channels remains the same (right circularly polarized). Second PBP grating 1220 diffracts the color channels based on the respective handedness of the color channels. Accordingly, second PBP grating 1220 diffracts the red channel into the +1 order direction and diffracts the green and blue channels into the −1 order direction. In this fashion, first PBP grating 1210, second PBP grating 1220, third PBP grating 1230, and color-selective filters 1235A and 1235B can provide a combination of diffractions so that a net result is that all colors channels are directed into the same point 1250 (or the same direction).

Figure 13A:
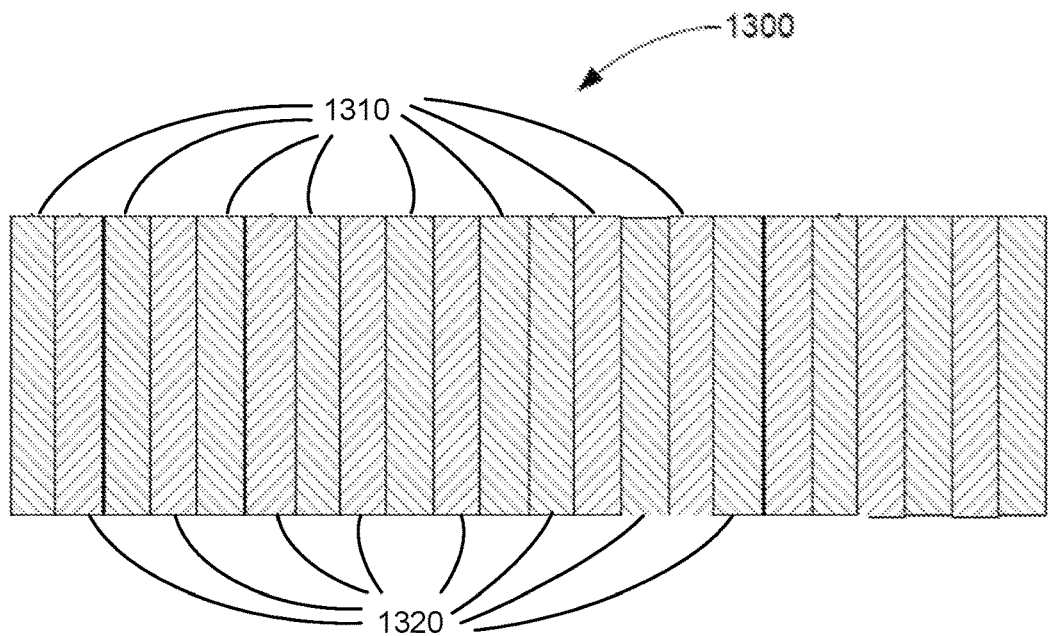
FIG. 13A illustrates electrodes of a variable phase optical phased array grating, according to some embodiments.

FIG. 13A illustrates electrodes of a variable phase optical phased array (OPA) grating 1300, according to some embodiments. Generally, a variable phase OPA grating comprises a pattern of two or more types of regions of electrodes, wherein regions of each type are electrically interconnected with one another (e.g., using electrodes, for example made of indium tin oxide (ITO)) but electrically isolated from regions of other types. For example, the variable phase OPA grating 1300 comprises linear regions (e.g., the pattern) of electrodes 1310 that alternate with linear regions of electrodes 1320. In FIG. 13A, every other electrode region (e.g., 1310) is of one type while intervening electrode regions (1320) are of another type. All linear regions of electrodes 1310 are electrically interconnected with one another so that all linear regions of electrodes 1310 are electrically switched on or off simultaneously while not affecting the electrical state of linear regions of electrodes 1320. Similarly, all linear regions of electrodes 1320 are electrically interconnected with one another so that all linear regions of electrodes 1320 are electrically switched on or off simultaneously while not affecting the electrical state of linear regions of electrodes 1310. Patterns and spacing of such linear regions of electrodes may be configured any number of ways to allow for various phase of pattern liquid crystal regions, which can lead to various diffraction angles.

Applying an electrical potential to the electrodes may alter the orientation, and thus alter the refractive index, of the liquid crystals in variable phase OPA grating 1300. In the variable phase OPA grating shown in FIG. 13A, the steering direction may be controlled by adjusting the voltage applied to one or more of electrodes 1310 and electrodes 1320.

Figure 13B:
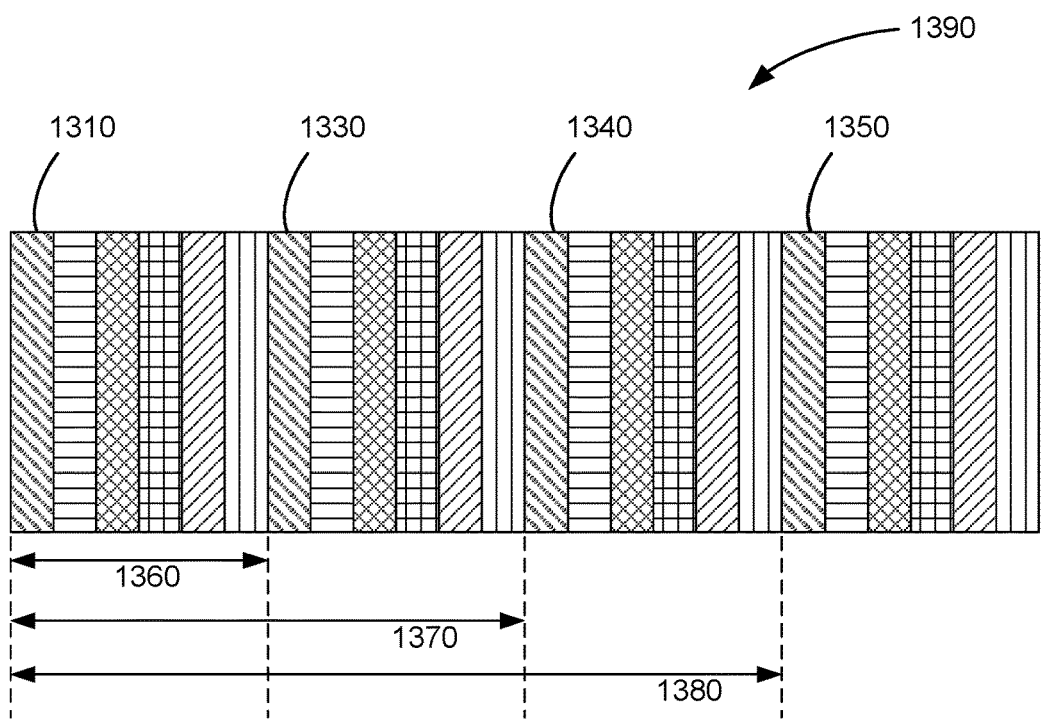
FIG. 13B illustrates electrodes of a variable pitch optical phased array grating, according to some embodiments.

FIG. 13B illustrates electrodes of a variable pitch optical phased array (OPA) grating 1390, according to some embodiments. The variable pitch OPA grating 1390 is similar to the variable phase OPA grating 1300 except that the variable pitch OPA grating 1390 includes more than two groups of electrodes (or individually selectable electrodes). This allows applying an electrical potential to only a subset of the electrodes for varying the pitch of the grating. For example, when the electrical potential is applied only to electrodes 1310, 1330, 1340, and 1350, the optical phased array 1300 operates like a grating with a pitch 1360. When the electrical potential is applied only to electrodes 1310 and 1340 (and other electrodes having the spacing of 1370), the optical phased array 1300 operates like a grating with the pitch 1370. When the electrical potential is applied only to electrodes 1310 and other electrodes having the spacing of 1380, the optical phased array 1300 operates like a grating with the pitch 1380. Because the diffraction angle depends on the pitch of the grating, changing the pitch of the grating allows steering the direction of the diffracted light.

The phase-sensitive elements (e.g., the SBGs, the PGs, and the OPAs) described herein may be used separately or in a stack of phase-sensitive elements. For example, FIGS. 14A-14B and 15A-15B illustrate stacks of switchable PGs, according to some embodiments.

Figure 14A:
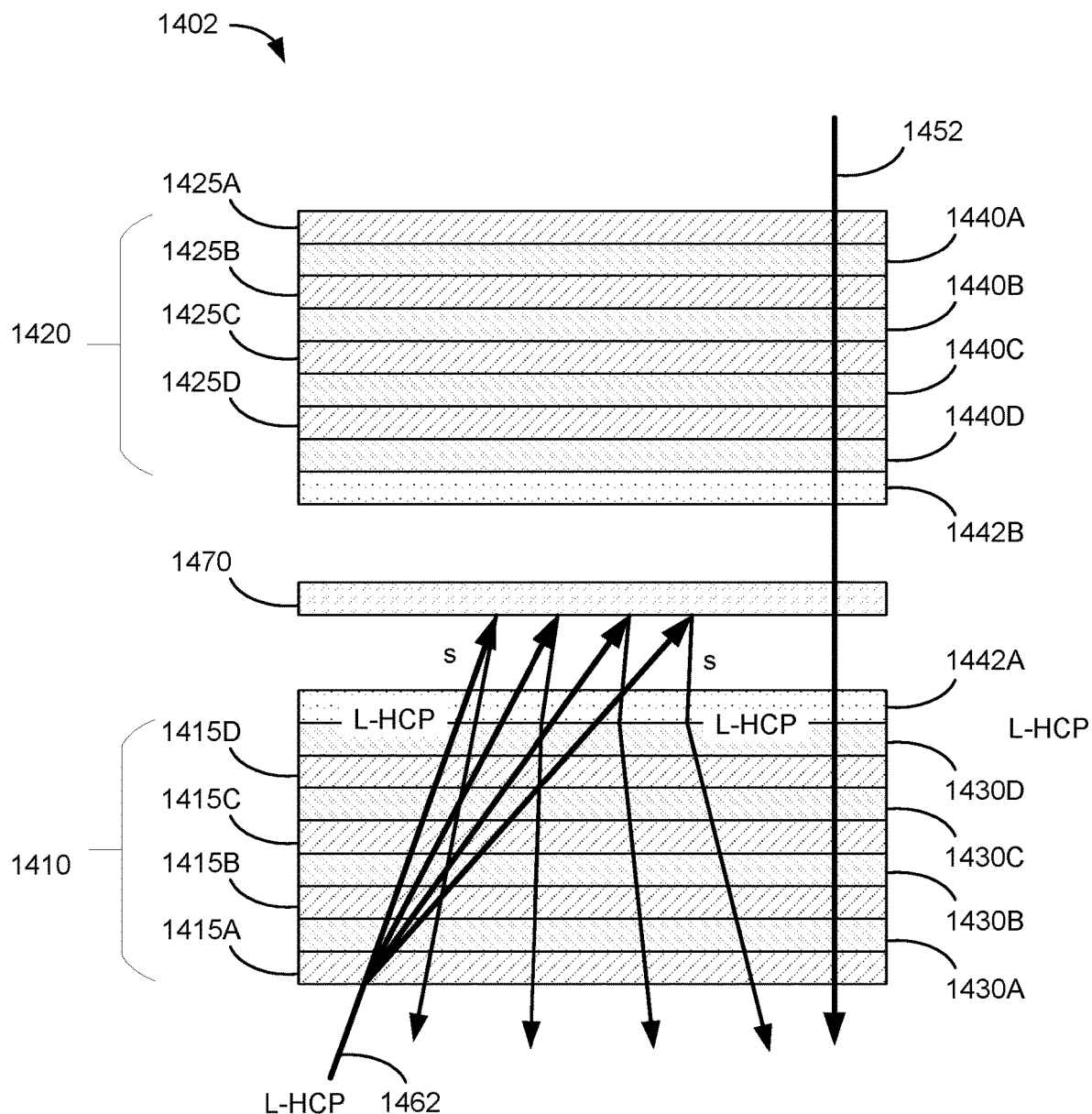
FIGS. 14A-14B and 15A-15B illustrate effects of stacks of switchable PBP elements on various light beams, according to some embodiments.

FIG. 14A illustrates an optical system 1402 that includes a first stack 1410 of layers of passive PGs 1415, a second stack 1420 of layers of passive PGs 1425, and intervening half-wave plates 1430 and 1440. A light beam 1452 transmits once through both first and second stacks 1410 and 1420 and a light beam 1462 transmits twice through first stack 1410 (after redirection by an optical element 1470). In some embodiments, light beam 1452 may be real-world light. Light beam 1462 may be image light generated to have left circular polarization, or guided to pass through a left circular polarizer, for example. Each grating layer (e.g., 1415 or 1425) is configured to redirect (e.g., steer) light by a particular angle (e.g., a discrete amount). For example, the layer 1415A may be configured to redirect light by 1°, the layer 1415B may be configured to redirect light by 2°, the layer 1415C may be configured to redirect light by 4°, and the layer 1415D may be configured to redirect light by 8°. Such configuration may be based, at least in part, on alignment and distribution of liquid crystals in the grating layer, for example. Moreover, each grating layer redirects (or does not redirect) light based on the polarization of the light. The polarization of the light impinging on a respective PG may be changed by switchable half-wave plates 1430 and 1440. Half-wave plates 1430 and 1440 may be switched on to change the polarization of the light to an opposite polarization (e.g., right-circular polarized to left-circular polarized, and vice versa) or may be switched off to maintain the polarization of the light (e.g., right-circular polarized remains right-circular polarized, and vice versa). This allows directing the light in any combination of the steering angles of the layers of passive PGs 1415 (e.g., 1°+2°+4°+8°=15°, −1°−2°−4°−8°=−15°, 1°+2°−4°+8°=7°, etc. per each pass through the first stack 1410).

In some embodiments, the optical element 1470 is a partial reflector. In some embodiments, the optical element 1470 is a holographic optical element. In some embodiments, the holographic optical element is configured to reflect light that satisfies a Bragg condition and transmit light that does not satisfy a Bragg condition. In such cases, linearly polarized light maintains its polarization state when reflected (e.g., an S-polarized light is reflected as an S-polarized light and a P-polarized light is reflected as a P-polarized light).

In some embodiments, each of first and second grating layer stacks 1410 and 1420 may redirect light based on a particular combination of layers 1415 and 1425 that are switched to an on-state or off-state. Such a combination may be, for instance, a first layer configured to steer the light by a first angle and a second layer configured to steer the light by a second angle. The combined effect by these layers is to redirect the light by the sum of the first angle and the second angle.

The waveplate 1442A (e.g., a quarter-wave plate) facilitates that the light that has passed through the stack 1410 of layers 1415 and intervening half-wave plates 1430 and the light provided back to the stack 1410 of layers 1415 and intervening half-wave plates 1430 after reflection by the optical element 1470 have the same handedness. For example, when a light beam 1462 provided to the optical system 1402, after passing through the stack of layers 1415 and intervening half-wave plates 1430, is left-circular polarized, the waveplate 1442A (e.g., a quarter-wave plate) changes the polarization of the light to s-polarization so that the light remains in the s-polarization after reflection by the optical element 1470 and the waveplate 1442A changes the polarization of the reflected light to left-circular polarization. In another example, when the light that has passed through the stack of layers 1415 and intervening half-wave plates 1430 is right-circular polarized, the waveplate 1442A (e.g., a quarter-wave plate) changes the polarization of the light to p-polarization so that the light remains in the p-polarization after reflection by the optical element 1470 and the waveplate 1442A changes the polarization of the reflected light to right-circular polarization. This allows the stack 1410 to further steer the reflected light. For example, when the light beam 1462 is steered by 15° by the stack 1410 before reflection by the optical element 1470, the stack 1410 may also steer the reflected light by 15°. Thus, in some embodiments, the waveplate 1442A is used to increase (e.g., double) the steering angle.

In some embodiments, at least one of the waveplates 1442A and 1442B is a quarter-wave plate (e.g., the waveplate 1442A is a quarter-wave plate for light impinging on the waveplate 1442A at a normal incidence angle). In some embodiments, the waveplate 1442A has a particular birefringence that the light that has passed through the stack of layers 1415 and intervening half-wave plates 1430 and the light provided back to the stack of layers 1415 and intervening half-wave plates 1430 after reflection by the optical element 1470 have the same handedness.

In some embodiments, each pair of a half-wave plate 1430 in the bottom stack and a corresponding half-wave plate 1440 in the top stack (e.g., a pair of the half-wave plate 1430A and the half-wave plate 1440A, a pair of the half-wave plate 1430B and the half-wave plate 1440B, a pair of the half-wave plate 1430C and the half-wave plate 1440C, or a pair of the half-wave plate 1430D and the half-wave plate 1440D) is activated together so that the birefringence of the half-wave plate in the bottom stack is compensated by the corresponding half-wave plate in the top stack. For example, when the half-wave plate 1430A is activated, the half-wave plate 1440A is also activated so that the birefringence of the half-wave plate 1430A is compensated by the half-wave plate 1440A for the real-world light 1452 so that the real-world light 1452 is not steered by the optical system 1402 as a whole (e.g., a real-world light entering the optical system 1402 in a particular direction exits from the optical system 1402 in the same particular direction).

This configuration allows the optical system 1402 to transmit the real-world light 1452 regardless of the polarization (e.g., the optical system 1402 is configured to transmit both the left-circular polarized light and the right-circular polarized light from the real world), and thus, the real-world light 1452 transmitted through the optical system 1402 has a higher brightness than the real-world light transmitted through an optical system that transmits light having only a particular polarization (e.g., transmitting right-circular polarized light but not left-circular polarized light).

Figure 14B:
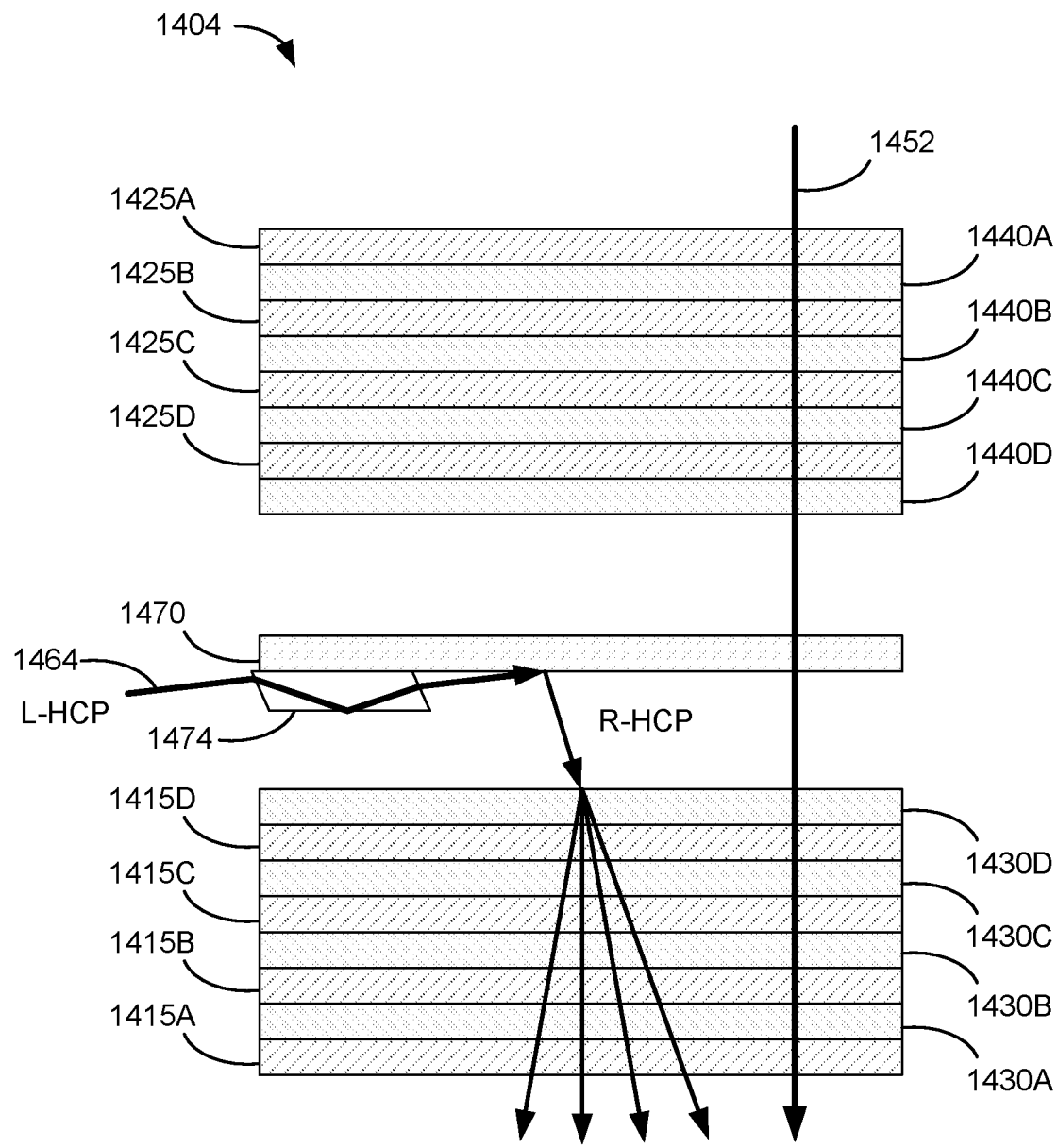

FIG. 14B illustrates an optical system 1404 that is similar to the optical system 1402 except that the optical system 1404 includes a waveguide 1474 instead of waveplates 1442A and 1442B. A light beam 1464 is provided to the optical element 1470 through the waveguide 1474 so that the light beam 1464 does not pass through the stack of grating layers 1415 and the half-wave plates 1430, thereby eliminating the need for changing the polarization of the light between the optical element 1470 and the stack of grating layers 1415 and half-wave plates 1430 (e.g., using a waveplate, such as waveplate 1442A).

This configuration also allows the optical system 1404 to transmit the real-world light 1452 regardless of the polarization, and thus, the real-world light 1452 transmitted through the optical system 1402 has a higher brightness than the real-world light transmitted through an optical system that transmits light having only a particular polarization.

Figure 15A:
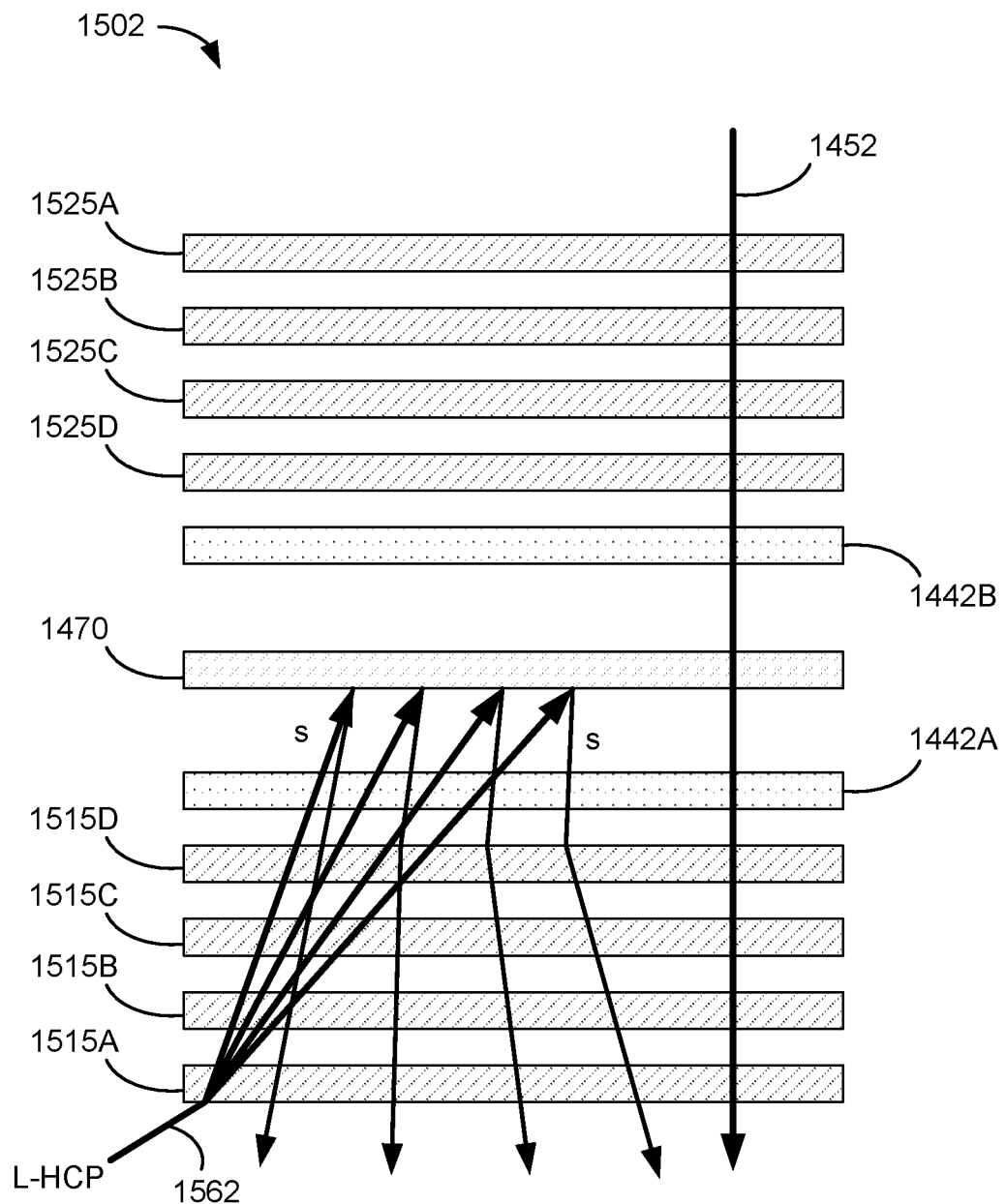

FIG. 15A illustrates an optical system 1502 that is similar to the optical system 1402 except that the grating layers 1515 include active PGs, which eliminates the need for switchable half-wave plates 1430A through 1430D and 1440A through 1440D shown in FIG. 14A. Thus, the optical system 1502 does not include switchable half-wave plates 1430A through 1430D and 1440A through 1440D.

Figure 15B:
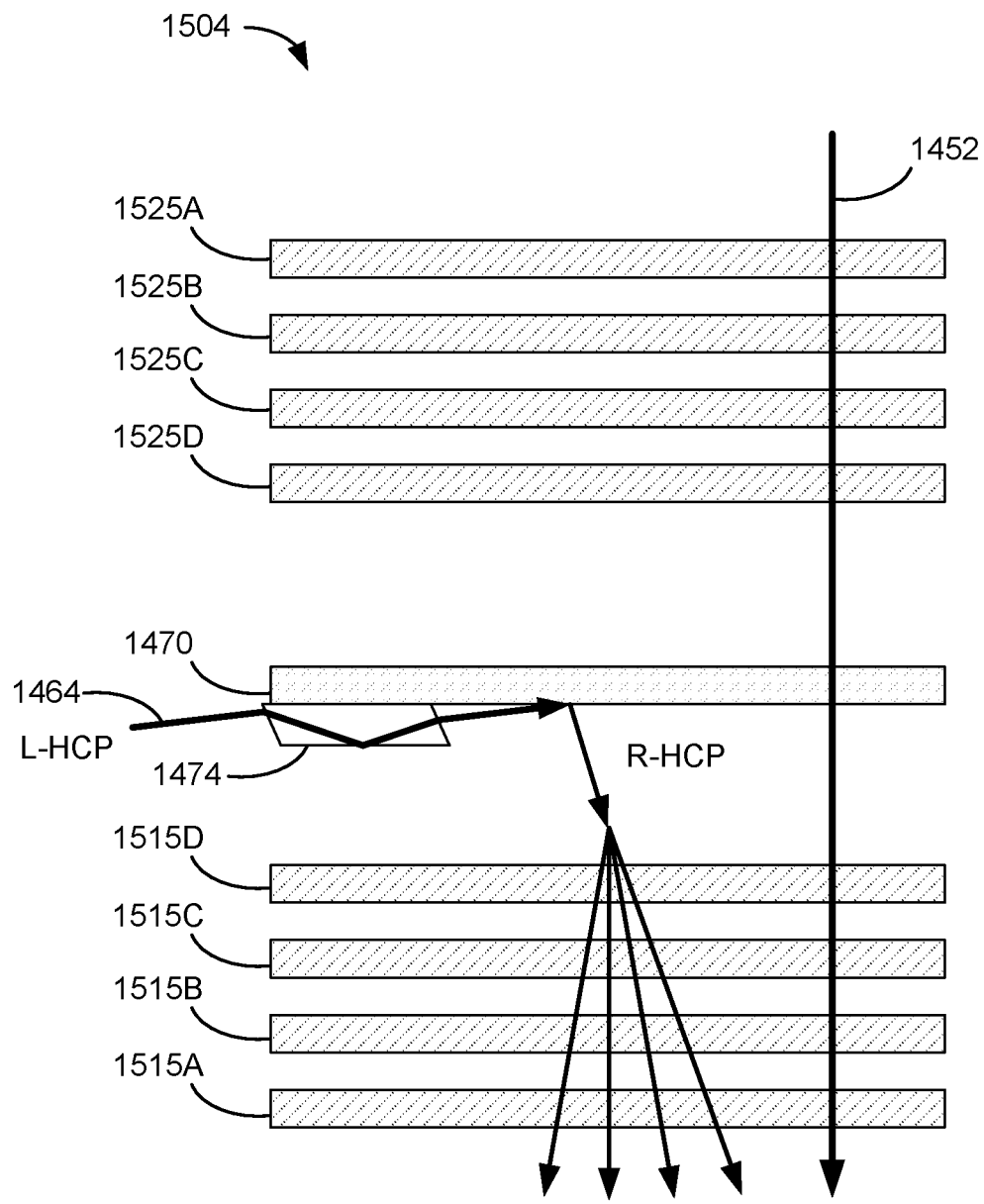

FIG. 15B illustrates an optical system 1504 that is similar to the optical system 1404 except that the grating layers 1515 include active PGs, which eliminates the need for switchable half-wave plates 1430A through 1430D and 1440A through 1440D shown in FIG. 14B. Thus, the optical system 1504 does not include switchable half-wave plates 1430A through 1430D and 1440A through 1440D.

As shown in FIGS. 14A-14B and 15A-15B, in some embodiments, the polarization-sensitive elements include passive polarization-sensitive elements coupled with switchable optical elements (e.g., switchable half-wave plates). In some other embodiments, the polarization-sensitive elements include active polarization-sensitive elements that do not require separate switchable optical elements. For brevity, such details are not repeated herein.

Although FIGS. 14A-14B and 15A-15B illustrate stacks of PGs, other polarization-sensitive elements (e.g., SBGs, PVGs, and OPAs) may be used in one or more stacks.

Figure 16A:
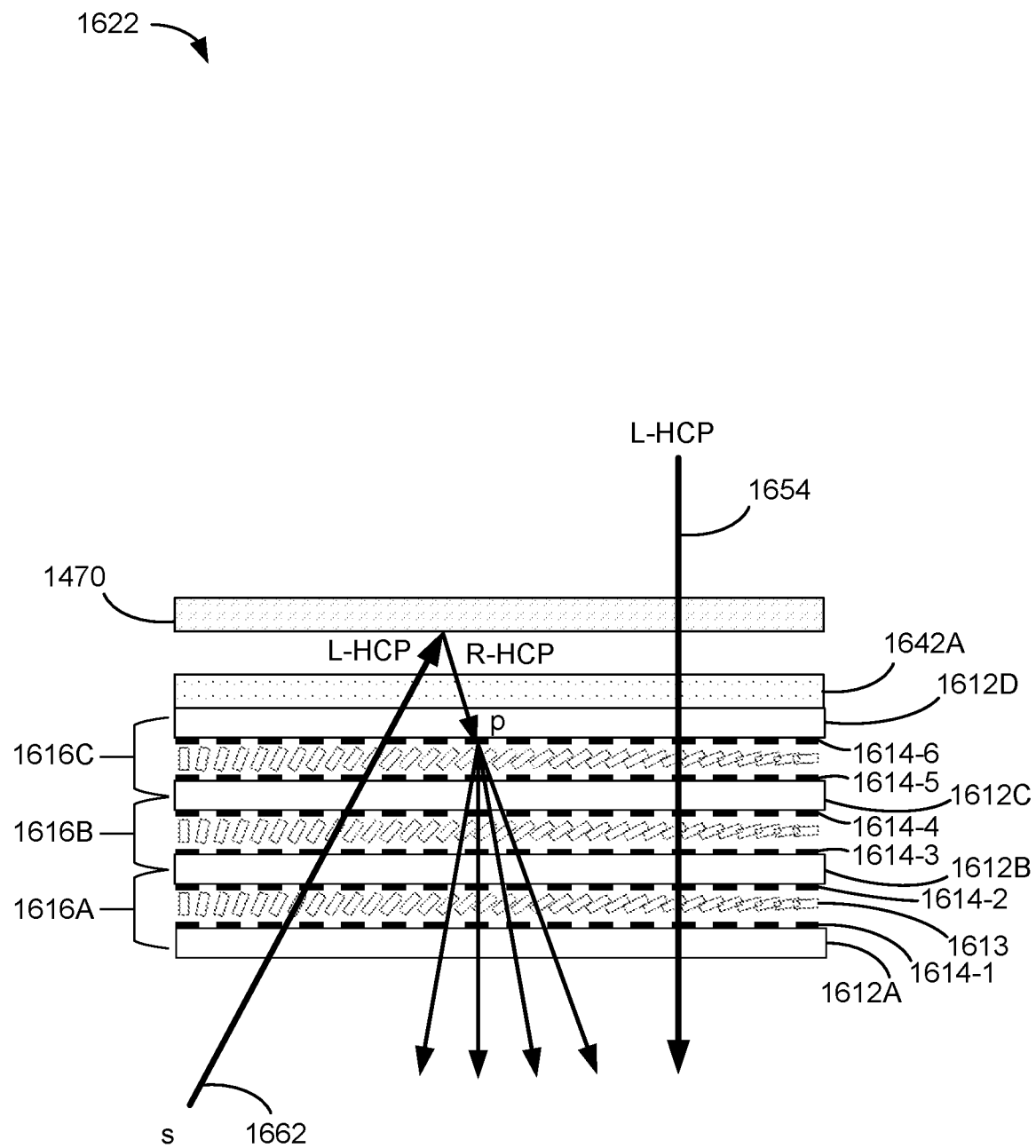
FIGS. 16A-16C illustrate effects of stacks of Optical Phased Array (OPA) elements on various light beams, according to some embodiments.
Figure 16B:
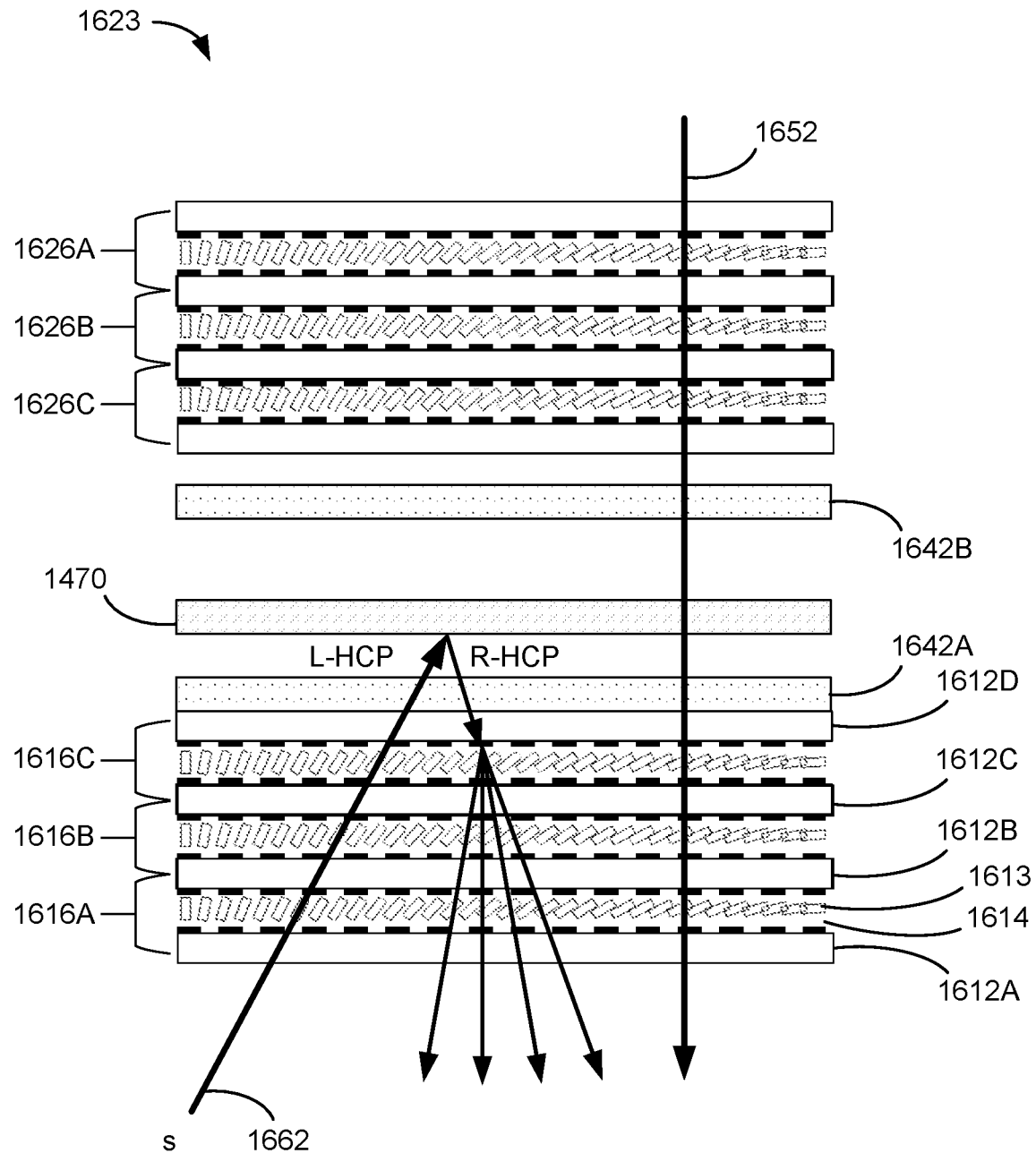
Figure 16C:
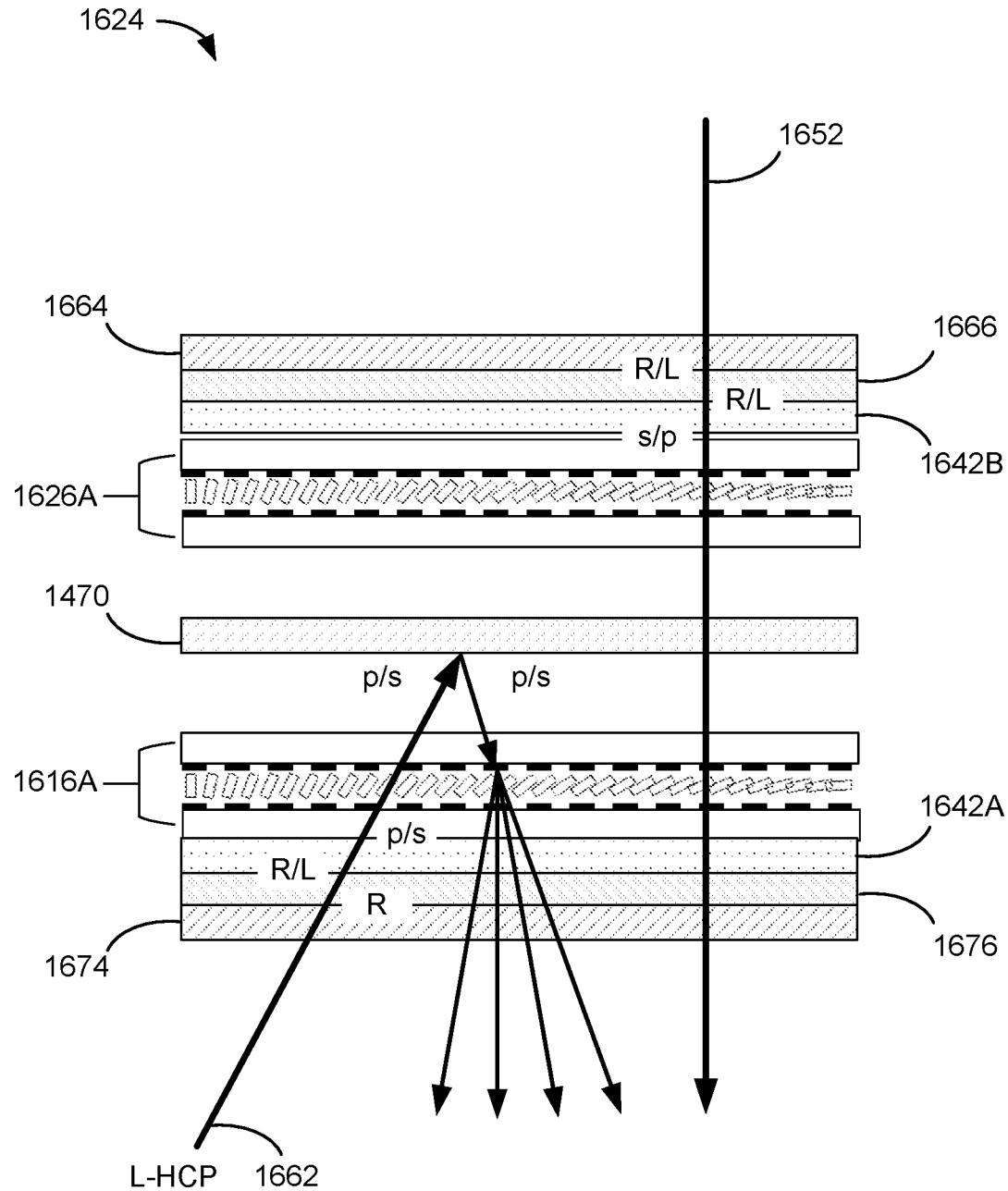

For example, FIGS. 16A-16C illustrate effects of stacks of OPA elements.

FIG. 16A illustrates an optical system 1622 that includes a stack of OPAs 1616A, 1616B, and 1616C, although the optical system 1622 may include fewer or more OPAs (e.g., the optical system 1622 may include one or more OPAs). Each OPA shown in FIG. 16A includes a liquid crystal layer 1613 and electrodes 1614 located between two substrates 1612. For example, OPA 1616A includes a liquid crystal layer 1613 and electrodes 1614-1 and 1614-2 located between substrates 1612A and 1612B, OPA 1616B includes a liquid crystal layer and electrodes 1614-3 and 1614-4 located between substrates 1612B and 1612C, and OPA 1616C includes a liquid crystal layer and electrodes 1614-5 and 1614-6 located between substrates 1612C and 1612D. Although FIG. 16A shows that electrodes 1614-2 and 1614-3 are located on opposite sides of same substrate 1612B and electrodes 1614-4 and 1614-5 are located on opposite sides of same substrate 1612C, in some cases, electrodes 1614-2 and 1614-3 may be located on separate substrates (e.g., a stack of a substrate with electrodes 1614-2 and a separate substrate with electrodes 1614-3 may be used instead of a single substrate 1612B with electrodes 1614-2 and 1614-3) and electrodes 1614-4 and 1614-5 may be located on separate substrates.

In some embodiments, one or more electrodes 1614 are patterned. For example, an OPA may include patterned electrodes on a first substrate and patterned electrodes on a second substrate (e.g., OPA 1616A includes patterned electrodes 1614-1 on substrate 1612A and patterned electrodes 1614-2 on substrate 1612B). In some embodiments, the patterned electrodes on the first substrate and the patterned electrodes on the second substrate are aligned (e.g., patterned electrodes 1614-1 and patterned electrodes 1614-2 are aligned as shown in FIG. 16A). In some embodiments, the patterned electrodes on the first substrate and the patterned electrodes on the second substrate are offset (e.g., the patterned electrodes on the first substrate and the patterned electrodes on the second substrate alternate or the patterned electrodes on the first substrate are partially offset from the patterned electrodes on the second substrate). In some embodiments, one or more layers of the electrodes 1614 may be configured as shown in FIG. 13A or 13B. In some embodiments, an OPA includes a single continuous electrode on the first substrate and patterned electrodes on the second substrate.

When the OPAs 1616 are configured to steer the p-polarized light, a light beam 1662 having the s-polarization passes through the OPAs 1616 without steering. The quarter-wave plate 1642A converts the light having the s-polarization to left-circular polarized light, which is reflected by the optical element 1470 as right-circular polarized light. The quarter-wave plate 1642A then converts the right-circular polarized light to p-polarized light, which is steered by the stack of OPAs 1616.

In comparison, the quarter-wave plate 1642-A converts a real-world light 1654 having left-circular polarization to s-polarized light, which is not steered by the stack of OPAs 1616. This allows steering of the light 1662 without causing steering of the real-world light 1654.

FIG. 16B illustrates an optical system 1623 that is similar to the optical system 1622 except that the optical system 1623 also includes a stack of OPA 1626A, OPA 1626B, and OPA 1626C and a quarter-wave plate 1642B so that the stack of OPAs 1626 compensates for the shifting of real-world light 1652 caused by the stack of OPAs 1616.

This configuration allows the optical system 1623 to transmit the real-world light regardless of the polarization, and thus, the real-world light 1652 transmitted through the optical system 1623 has a higher brightness than the real-world light transmitted through an optical system that transmits light having only a particular polarization (e.g., transmitting left-circular polarized light but not right-circular polarized light).

FIG. 16C illustrates an optical system 1624 that includes a stack of an OPA 1616A, a quarter-wave plate 1642A, a switchable half-wave plate 1676, and a PBP grating 1674 and a stack of an OPA 1626A, a quarter-wave plate 1642B, a switchable half-wave plate 1666, and a PBP grating 1664.

The optical system 1624 utilizes both the OPA 1616A and the PBP grating 1674 for steering the light beam 1662, which provides a large steering angle without using a stack of multiple OPAs on either side of the optical element 1470. In addition, the combination of the OPA 1616A and the PBP grating 1674 allows continuous tuning of the steering angle using the OPA 1616A.

When OPAs 1616 are configured to steer the p-polarized light, a light beam 1662 having the s-polarization passes through OPAs 1616 without steering. When no steering by OPA 1616A is needed, the switchable half-wave plate 1676 is configured to provide the left-circular polarized light toward the quarter-wave plate 1642A, which, in turn, converts the left-circular polarized light to s-polarized light, which is not steered by OPA 1616A. However, when steering by OPA 1616A is needed, the switchable half-wave plate 1676 is configured to provide the right-circular polarized light toward the quarter-wave plate 1642A, which, in turn, converts the right-circular polarized light to p-polarized light, which is steered by OPA 1616A. Because the p-polarized light is steered twice by OPA 1616A (a first time before reflection by the optical element 1470 and a second time after the reflection by the optical element 1470), the steering angle of OPA 1616A can be half of a steering angle of an OPA in a configuration where light passes through the OPA only once. This reduces the thickness of OPA 1616A, thereby enabling a compact and low-weight beam steering system, which can be used in head-mounted display devices.

The stack of OPA 1626A, quarter-wave plate 1642B, switchable half-wave plate 1666, and PBP grating 1664 is configured to compensate for the stack of OPA 1616A, quarter-wave plate 1642A, switchable half-wave plate 1676, and PBP grating 1674 so that steering of the real-world light by the stack of OPA 1626A, quarter-wave plate 1642B, switchable half-wave plate 1666, and PBP grating 1664 is canceled by steering of the real-world light by the stack of OPA 1616A, quarter-wave plate 1642A, switchable half-wave plate 1676, and PBP grating 1674. Similar to the optical system 1623 shown in FIG. 16B, the optical system 1624 allows transmission of the real-world light regardless of the polarization, and thus, the real-world light 1652 transmitted through the optical system 1624 has a higher brightness than the real-world light transmitted through an optical system that transmits light having only a particular polarization).

FIGS. 17A-21 illustrate a number of example optical system configurations that involve one or more PBP elements of various types. Such systems may be included in, for example, near-eye display device for VR, AR, or MR. In various embodiments, an optical system for an AR, VR, and MR near-eye display device is configured to process image light, which is generated by a pixelated light source driven by an application executed by a computer processor. The optical system may process such virtual light to form an image at an exit pupil of the optical system, which may coincide with a location of an eye of a user of the near-eye display device. As described below, optical properties of the optical system may be configured to change so that the location of the exit pupil may be changed in response to a change in the location (and/or orientation) of the eye with respect to the optical system. Accordingly, the near-eye display device may include an eye-tracking module to measure and track motion of the eye.

In various embodiments, an optical system for an AR and MR near-eye display device is configured to process real-world light. Unlike the case for image light, the optical system need not introduce optical power to the image of the real-world light at the exit pupil and need not change the location of the exit pupil for the real-world light in response to a change in the location (and/or orientation) of the eye with respect to the optical system. Accordingly, real-world light and image light, though co-located in portions of the optical system, are, at least in some embodiments, processed differently from one another by the optical system, as described below.

Optical system configurations described for the following embodiments include various polarization-sensitive optical elements including those that operate on the principle of the Pancharatnam-Berry Phase (PBP), PVGs, and SBGs, which are polarization sensitive optics. In particular, a PBP-based element may redirect (e.g., steer) incident light having any polarization. Thus, using this type of optical element for an AR or MR system may require a compensation stack for real-world light. On the other hand, PVG and SBG type elements steer light having a particular polarization but do not interfere with light of an orthogonal polarization. A PVG type of element operates selectively to a particular circular polarization and an SBG type of element operates selectively to a particular linear polarization. Unlike PBP, for PVG and SBG type of elements, a compensation stack may not be necessary for AR or MR operations. For example, real-world light may pass through a polarizer to give the real-world light a polarization that is not affected by a subsequent stack of polarization-sensitive optical elements. OPA is a type of optical element that may be configured to be polarization dependent or polarization independent. Thus, AR and MR systems that include an OPA may have a relatively high (e.g., approaching 100%) transmission for real world light.

Figure 17A:
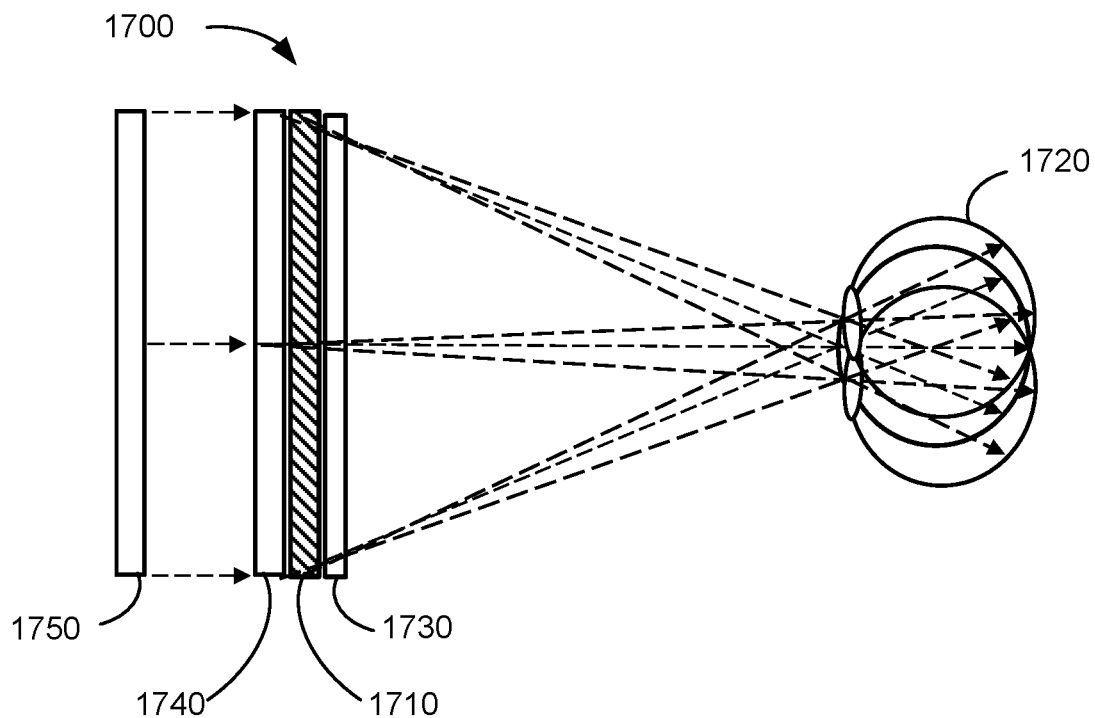
FIG. 17A is a diagram illustrating a portion of an optical system that includes polarization-sensitive elements for virtual reality operations, according to some embodiments.

FIG. 17A is a diagram illustrating a portion of an optical system 1700 that includes various types of polarization-sensitive elements for virtual reality operations, according to some embodiments. For example, optical system 1700 may be included in a virtual reality NED.

The optical system 1700 may include a module 1710 comprising an active and/or passive polarization-sensitive element, such as SBG, PBP, PVG, or OPA. In some implementations, module 1710 may include a stack of polarization-sensitive elements or a single polarization-sensitive element.

In the case of module 1710 including one or more active elements, module 1710 may have an electronically selectable birefringence to steer light incident on the module 1710 at a selected angle based, at least in part, on an electronic signal provided by a control module, such as the control module 520 illustrated in FIG. 5. The control module may provide the electronic signal to the module 1710 to selectively control a steer direction of the incident light toward an eye 1720 of a user of the NED, for example, so that an exit pupil of optical system 1700 is positioned adjacent to the pupil of eye 1720.

In some embodiments, the control module may provide a sequential electronic signal to module 1710 to scan through multiple steer directions of the light incident on the module. If such scanning is performed relatively rapidly, then the optical system 1700 may produce multiple exit pupils in rapid succession, at a rate at which the scanning may seem unperceivable to a user (e.g. 60 frames per second per pupil), for example. In some examples, the frame rates for each pupil replication may have a frame rate that is perceivable to the user, but sufficient for presenting video information (e.g. 30 fps). In such an example, an eye tracking module may not be needed. However, when the optical system 1700 includes an eye tracking module, the eye tracking module could help reduce the number of pupil replications based on a general known location of a user's pupil. In some examples, a single projection of an image may be steered towards the user's eyes without making any replications. The reduced replications (or no replication) would help increase frame rate capabilities, while increased replication would help with providing an error buffer for pupil steering. Thus, in some implementations, multiple replications are used in combination with eye tracking.

In some embodiments, optical system 1700 includes an eye tracking module 1730 to provide eye position information to the control module. Eye tracking module 1730 may be located at any of a number of locations within or on a NED, for example.

Optical system 1700 may further include a lens module 1740 to focus image light toward the exit pupil of optical system 1700. Lens module 1740 may comprise a PBP lens, a PVG lens, or a pancake lens, just to name a few examples. An image source 1750 may provide image light to lens module 1740. Such a source, which may be a laser projector, for example, may produce polarized light.

In some embodiments, module 1710 may comprise a polarizer to polarize light incident on the module (e.g., a linear polarizer when the module 1710 includes a SBG or a circular polarizer when the module 1710 includes a PG or PVG).

Figure 17B:
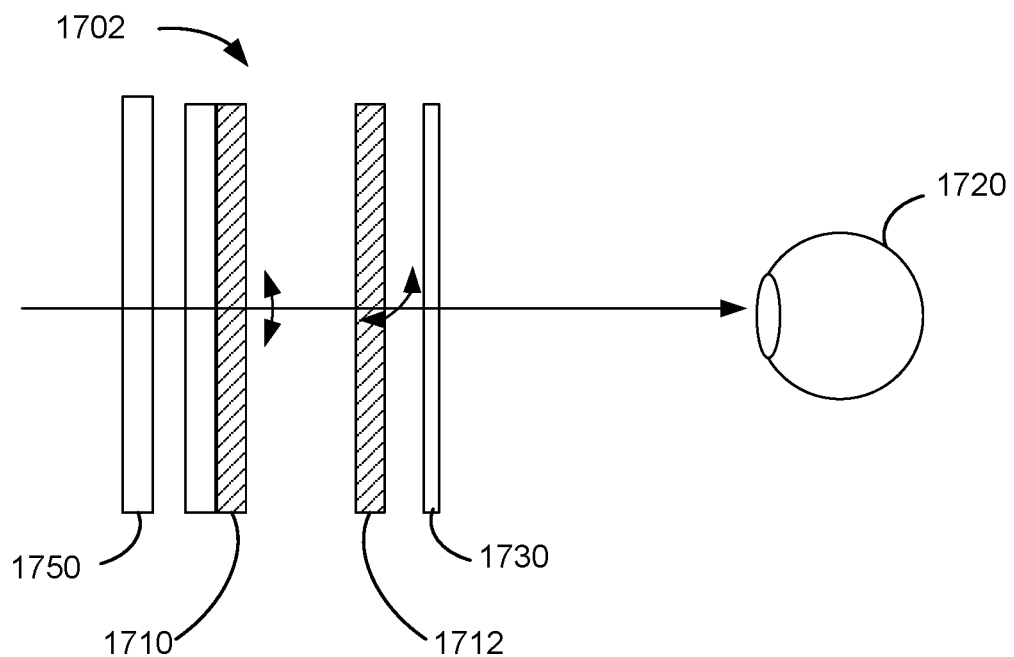
FIG. 17B is a diagram illustrating a portion of an optical system that includes polarization-sensitive elements for virtual reality operations, according to some embodiments.

FIG. 17B illustrates optical system 1702, which is similar to optical system 1700 except that optical system 1702 includes additional elements or an additional module configured for steering light in two dimension. For example, when module 1710 is configured to steer light along a first axis (e.g., an x-axis), optical system 1702 may include a second module 1712 configured to steer light along a second axis that is non-parallel to the first axis (e.g., a y-axis). In some embodiments, the second axis is substantially perpendicular to the first axis. As used herein, "substantially perpendicular" indicates a direction that is perpendicular within, for example, several degrees or so. Such a configuration may provide mutually orthogonal (e.g., x-y) directional steering control of the image light. In such embodiments, the control module may be configured to provide a second electronic signal to the additional elements or the additional module 1712 to selectively control a second steer direction of the light incident on the additional elements or the additional module.

In some embodiments, although not illustrated, module 1710 of optical system 1700 or 1702 may comprise two (or more) stacks of liquid crystal layers separated by a particular distance (e.g., the stacks shown in FIG. 14A). Such a configuration may result in displaced or translated light (or image) while preserving concomitant light angles. For example, if the two stacks are electrically driven in opposite states (e.g., one stack is driven to steer at 15 degrees and the other stack is driven to steer at −15 degrees), then a resulting pupil may be translated while all light angles are preserved.

All or some of the components of system 1700 or 1702 may be in physical contact with one another, sharing a substrate with one another, laminated with one another, optically in contact with one another, having index matching fluid or optical glue between one another, and/or may have space therebetween.

Figure 18:
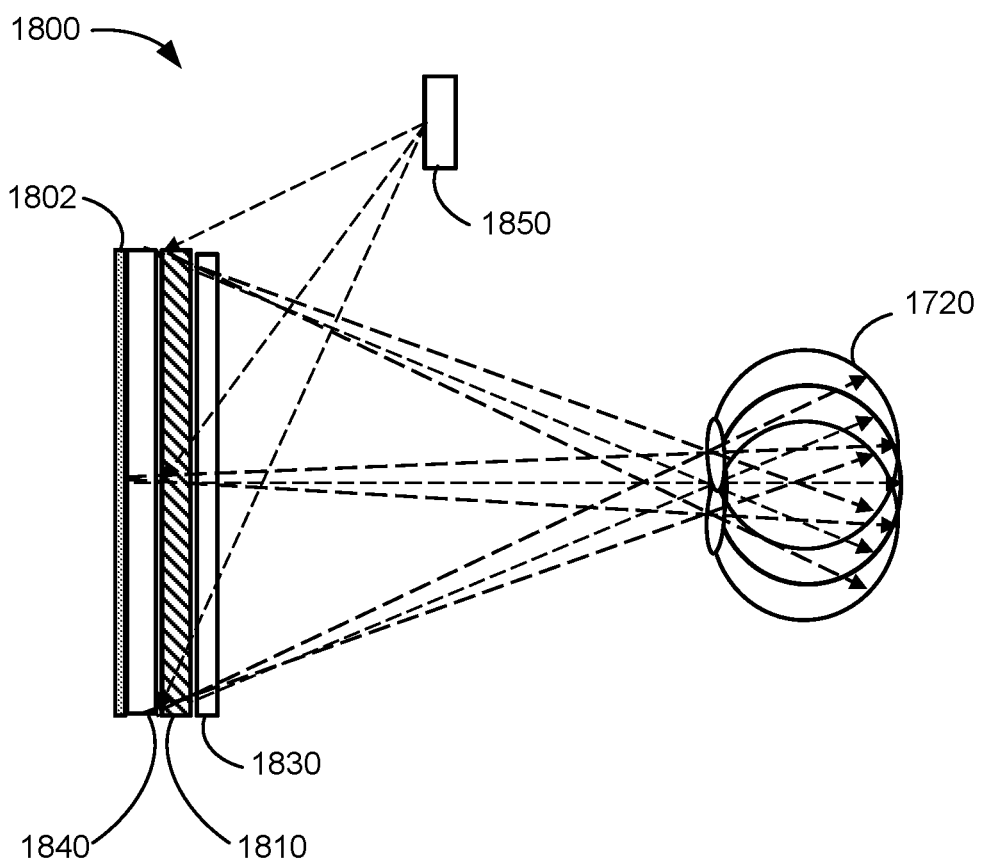
FIG. 18 is a diagram illustrating a portion of an example optical system that includes polarization-sensitive elements for augmented reality operations, according to some embodiments.

FIG. 18 is a diagram illustrating a portion of an example optical system 1800 that includes polarization-sensitive elements for augmented reality operations, according to some embodiments. For example, optical system 1800 may be included in an augmented reality NED. Optical system 1800 may include one or more of: module 1810, which corresponds to module 1710; eye tracking module 1830, which corresponds to eye tracking module 1730; viewing optical system 1840; and an image source 1850, which corresponds to the image source 1750. Optical system 1800 differs from optical system 1700 in that the image source 1850 is positioned off the optical axis of the module 1810 so that the real-world light can be transmitted toward the eye 1720 of the user of the NED without being blocked by the image source 1850. In addition, the viewing optical system 1840 is configured to reflect image light from the image source 1850 toward the eye 1720 while the viewing optical system 1840 remains transparent to real-world light (e.g., holographic gratings and PVG gratings). These features, in combination, enable an augment reality device.

In some examples, the light from the image source 1850 is polarized (e.g., linear polarization or circular polarization). In some implementations, the module 1810 is configured to steer the light from the image source 1850. In some embodiments, the module 1810, upon steering the light from the image source 1850, changes the polarization of the light from the image source 1850 to a different polarization (e.g., an orthogonal polarization). In some embodiments, the viewing optical system 1840 changes the polarization of the steered light to a different polarization (e.g., an orthogonal polarization). When the module 1810 is configured to steer light having a particular polarization, the module 1810 does not further steer the previously steered light after the previously steered light is modified to have an orthogonal polarization. Alternatively, the module 1810 is configured not to steer the light from the image source 1850 having the particular polarization, and instead configured to steer light having an orthogonal polarization. The light from the image source 1850 is transmitted through the module 1810 and the viewing optical system 1840 reflects the transmitted light and changes the polarization of the transmitted light to a different polarization (e.g., an orthogonal polarization) so that the module 1810 may steer the reflected light.

When the module 1810 is configured to steer light having a particular polarization, in some embodiments, the optical system 1800 includes a polarizer 1802 to change the polarization of the real-world light to an orthogonal polarization (or transmit a component of the real-world light having the orthogonal polarization) so that the transmitted real-world light is not steered by the module 1810.

Figure 19:
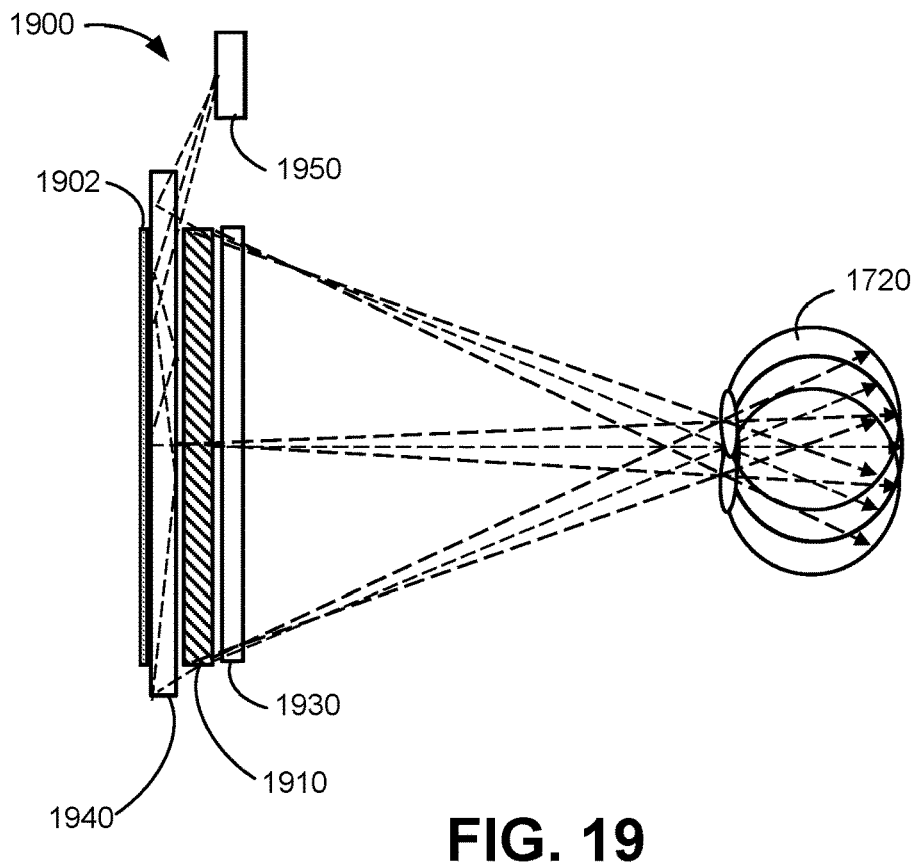
FIG. 19 is a diagram illustrating a portion of an optical system that includes polarization-sensitive elements and a waveguide for augmented reality operations, according to some embodiments.

FIG. 19 is a diagram illustrating a portion of an optical system 1900 that includes a waveguide 1940 for augmented reality operations, according to some embodiments. For example, optical system 1900 may be included in an augmented reality NED. The optical system 1900 may include one or more of: an image source 1950, which corresponds to the image source 1850; an eye tracking module 1930, which corresponds to the eye tracking module 1830; a module 1910, which corresponds to the module 1810; and a polarizer 1902, which corresponds to the polarizer 1802.

Optical system 1900 differs from optical system 1800 in that the optical system 1900 includes the waveguide 1940 instead of the viewing optical system 1840. The waveguide 1940 is configured to receive image light from an image light source 1950, which corresponds to the image light source 1850, and transfer the image light along the waveguide 1940 via total internal reflection. The transferred image light is out-coupled from the waveguide 1940 by one or more surface features on the waveguide 1940, such as surface relief gratings, volume Bragg gratings, and/or the like, for example. The waveguide 1940 provides flexibility in placement of the image source 1950. In addition, the waveguide 1940 may be configured to out-couple the image light from a plurality of locations on the waveguide 1940, which facilitates pupil replications.

The out-coupled image light from the waveguide 1940 is sent toward the module 1910, which steers the image light based on the eye position information.

Figure 20:
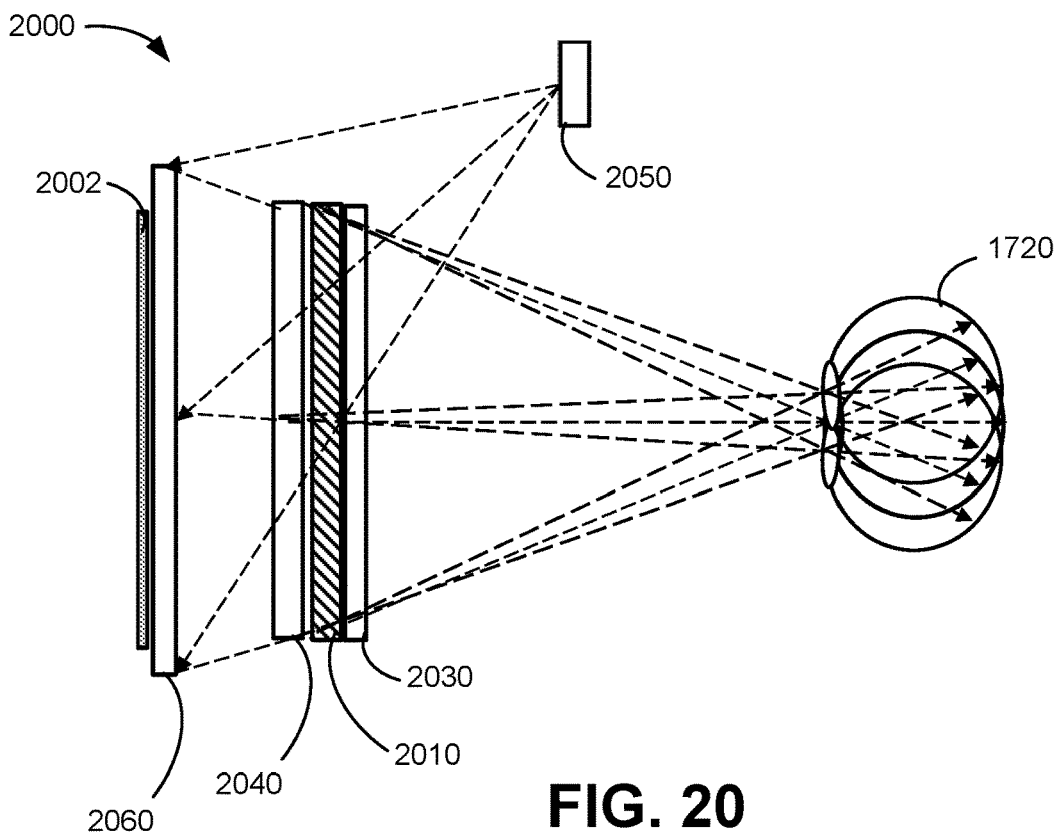
FIG. 20 is a diagram illustrating a portion of another optical system that includes polarization-sensitive elements for augmented reality operations, according to some embodiments.

FIG. 20 is a diagram illustrating a portion of another example optical system 2000 that includes polarization-sensitive elements for augmented reality operations, according to some embodiments. For example, optical system 2000 may be included in an augmented reality NED. In some implementations, optical system 2000 may include one or more of: an image source 2050, which corresponds to the image source 1850; an eye tracking module 2030, which corresponds to the eye tracking module 1830; a module 2010, which corresponds to the module 1810; a viewing optical system 2040, which corresponds to the viewing optical system 1840; and a polarizer 2002, which corresponds to the polarizer 1802.

Optical system 2000 differs from optical system 1800 in that the optical system 2000 includes a layer 2060 configured to diffuse image light from the image projector 2050 but remain transparent to the real-world light. Thus, the layer 2060 allows the real-world light to transmit through the layer 2060 while causing the image light from the image projector 2050 to propagate toward the eye 1720 based, at least in part, on diffuse reflectance.

Figure 21:
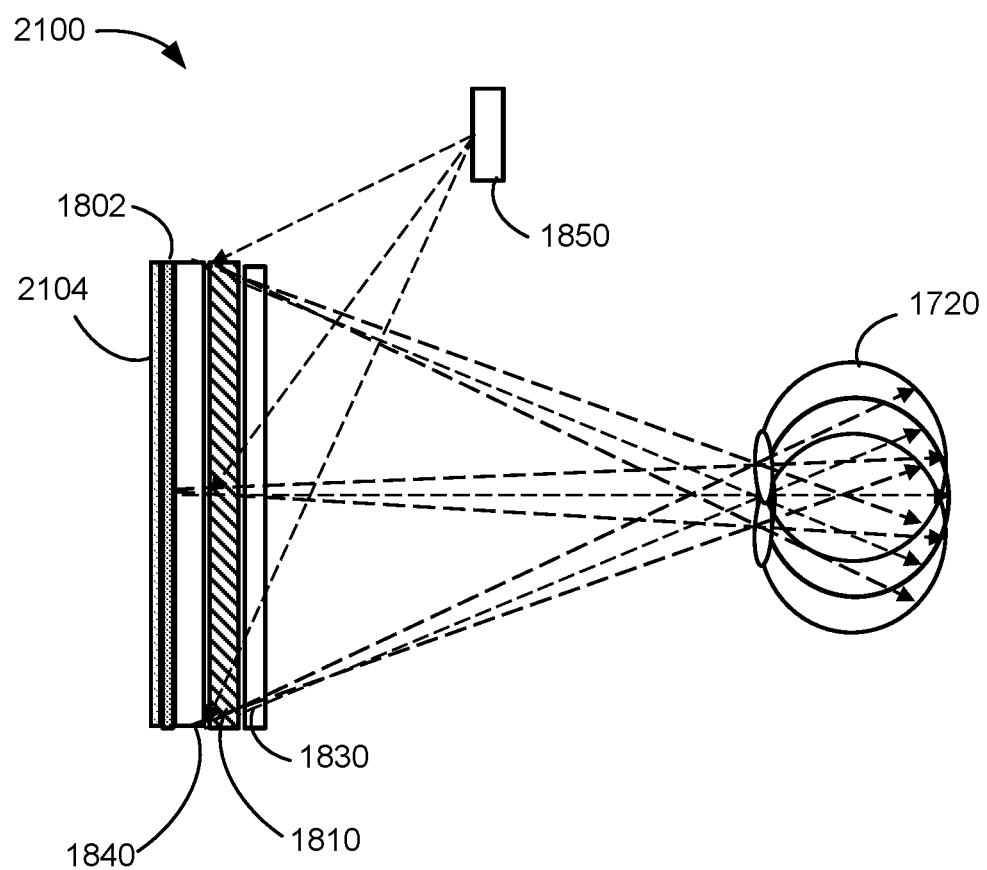
FIG. 21 is a diagram illustrating a portion of an example optical system that includes polarization-sensitive elements for mixed reality operations, according to some embodiments.

FIG. 21 is a diagram illustrating a portion of an optical system 2100 that includes polarization-sensitive elements for mixed reality operations, according to some embodiments. For example, optical system 2100 may be included in a mixed reality NED. Optical system 2100 is similar to optical system 1800, except that the optical system 2100 includes a light shutter 2104 to control propagation of real-world light.

In some embodiments, optical system 2100 may include a light shutter 2104 to reduce or block at least a proportion of the real-world light incident on the module 1810. When the light shutter 2104 is configured to completely block the real-world light, the optical system 2100 operates as a virtual reality display. When the light shutter 2104 is configured to completely transmit the real-world light, the optical system 2100 operates as an augmented reality display. In some cases, the shutter 2104 is configured to transmit a portion of the real-world light and block another portion of the real-world light. Light shutter 2104 may comprise, for example, a polymer dispersed (e.g., polymer matrix) liquid crystal (PDLC) structure to which an electric field may be applied at various voltages to adjust transmissivity of the light shutter. In another example, light shutter 2104 may comprise a dispersion of liquid crystals, of which some are opaque (due to a dye, for example), between ITO-covered substrates. An electric field applied across the liquid crystal dispersion tends to align the liquid crystals. Such alignment, or non-alignment, affects the transmissivity of the liquid crystal dispersion. Thus, the electric field may be applied at various voltages to adjust transmissivity of the liquid crystal dispersion and the overall light shutter. In yet another example, light shutter 2104 may comprise a polymer stabilized cholesteric texture (PSCT), which comprises a dispersion of liquid crystals. An electric field applied across the liquid crystal dispersion tends to align individual liquid crystals, and transmissivity is relatively high. On the other hand, absence of an electric field allows the individual liquid crystals to group to one another in various directions, resulting in a relatively low transmissivity. Thus, the electric field may be applied at various voltages to adjust transmissivity of the liquid crystal dispersion and the overall light shutter.

Although certain features are described with respect to a particular embodiment shown in FIGS. 17A-21, such features can be implemented in the other embodiments shown in FIGS. 17A-21. For example, the second module 1712 described with respect to FIG. 17B may be included in any of the optical systems 1800, 1900, 2000, and 2100. For brevity, such details are omitted herein.

Figure 22:
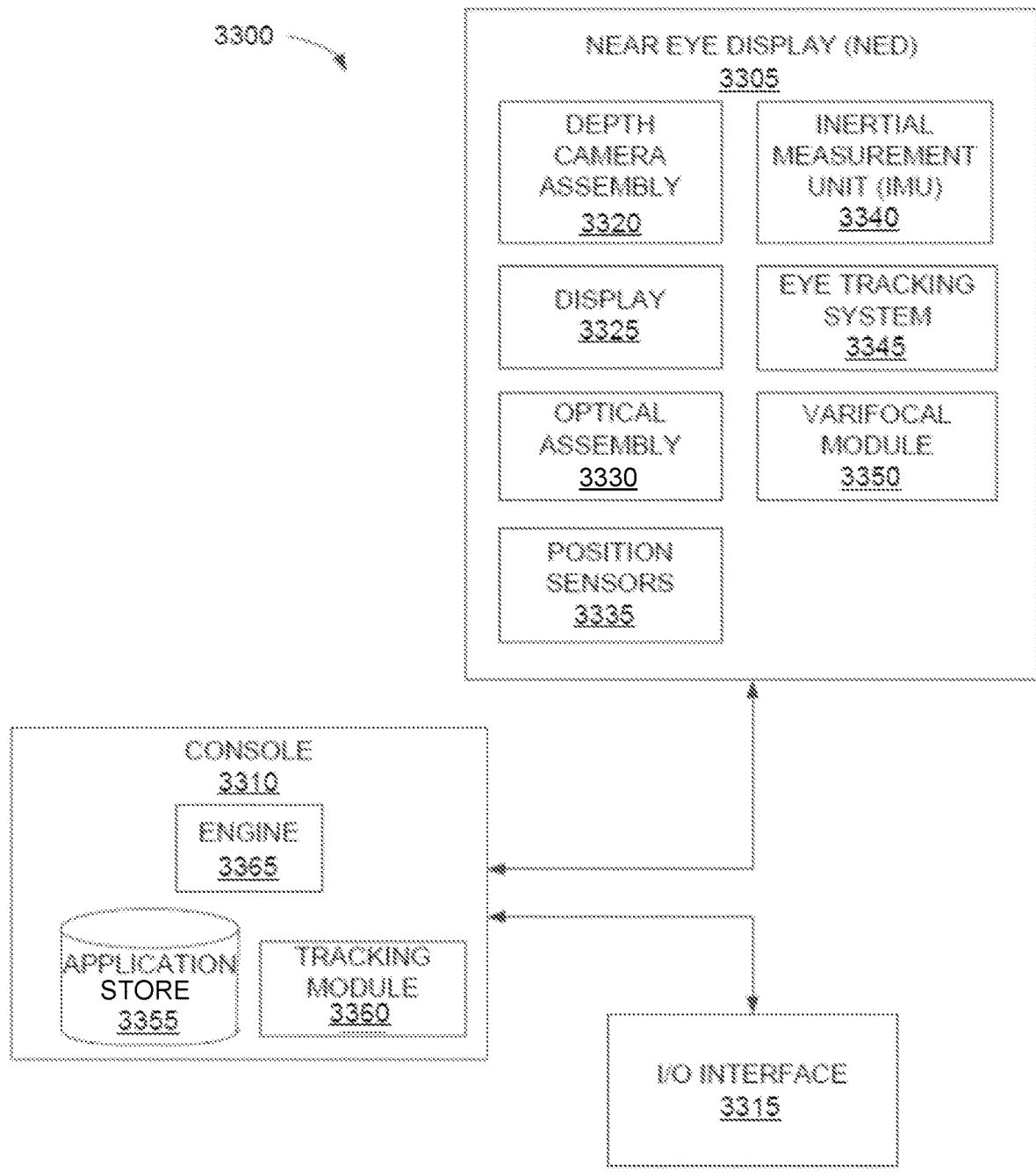
FIG. 22 is a block diagram of a NED system in which a console operates, according to some embodiments.

FIG. 22 is a block diagram of a near eye display (NED) system 3300 in which a console 3310 operates. The NED system 3300 may operate in a VR system environment, an AR system environment, an MR system environment, or some combination thereof. The NED system 3300 shown in FIG. 22 comprises a NED 3305 and an input/output (I/O) interface 3315 that is coupled to the console 3310.

While FIG. 22 shows an example NED system 3300 including one NED 3305 and one I/O interface 3315, in other embodiments any number of these components may be included in the NED system 3300. For example, there may be multiple NEDs 3305 that each has an associated I/O interface 3315, where each NED 3305 and I/O interface 3315 communicates with the console 3310. In alternative configurations, different and/or additional components may be included in the NED system 3300. Additionally, various components included within the NED 3305, the console 3310, and the I/O interface 3315 may be distributed in a different manner than is described in conjunction with FIG. 22 in some embodiments. For example, some or all of the functionality of the console 3310 may be provided by the NED 3305.

The NED 3305 may be a head-mounted display that presents content to a user. The content may include virtual and/or augmented views of a physical, real-world environment including computer-generated elements (e.g., two-dimensional or three-dimensional images, two-dimensional or three-dimensional video, sound, etc.). In some embodiments, the NED 3305 may also present audio content to a user. The NED 3305 and/or the console 3310 may transmit the audio content to an external device via the I/O interface 3315. The external device may include various forms of speaker systems and/or headphones. In various embodiments, the audio content is synchronized with visual content being displayed by the NED 3305.

The NED 3305 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other.

As shown in FIG. 22, the NED 3305 may include a depth camera assembly (DCA) 3320, a display 3325, an optical assembly 3330, one or more position sensors 3335, an inertial measurement unit (IMU) 3340, an eye tracking system 3345, and a varifocal module 3350. In some embodiments, the display 3325 and the optical assembly 3330 can be integrated together into a projection assembly. Various embodiments of the NED 3305 may have additional, fewer, or different components than those listed above. Additionally, the functionality of each component may be partially or completely encompassed by the functionality of one or more other components in various embodiments.

The DCA 3320 captures sensor data describing depth information of an area surrounding the NED 3305. The sensor data may be generated by one or a combination of depth imaging techniques, such as triangulation, structured light imaging, time-of-flight imaging, laser scan, and so forth. The DCA 3320 can compute various depth properties of the area surrounding the NED 3305 using the sensor data. Additionally or alternatively, the DCA 3320 may transmit the sensor data to the console 3310 for processing.

The DCA 3320 includes an illumination source, an imaging device, and a controller. The illumination source emits light onto an area surrounding the NED 3305. In some embodiments, the emitted light is structured light. The illumination source includes a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (such as edge emitters), inorganic or organic light-emitting diodes (LEDs), a vertical-cavity surface-emitting laser (VCSEL), or some other source. In some embodiments, a single emitter or a plurality of emitters in the illumination source can emit light having a structured light pattern. The imaging device captures ambient light in the environment surrounding NED 3305, in addition to light reflected off of objects in the environment that is generated by the plurality of emitters. In various embodiments, the imaging device may be an infrared camera or a camera configured to operate in a visible spectrum. The controller coordinates how the illumination source emits light and how the imaging device captures light. For example, the controller may determine a brightness of the emitted light. In some embodiments, the controller also analyzes detected light to detect objects in the environment and position information related to those objects.

The display 3325 displays two-dimensional or three-dimensional images to the user in accordance with pixel data received from the console 3310. In various embodiments, the display 3325 comprises a single display or multiple displays (e.g., separate displays for each eye of a user). In some embodiments, the display 3325 comprises a single or multiple waveguide displays. Light can be coupled into the single or multiple waveguide displays via, e.g., a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a laser-based display, one or more waveguides, other types of displays, a scanner, a one-dimensional array, and so forth. In addition, combinations of the displays types may be incorporated in display 3325 and used separately, in parallel, and/or in combination.

The optical assembly 3330 magnifies image light received from the display 3325, corrects optical errors associated with the image light, and presents the corrected image light to a user of the NED 3305. The optical assembly 3330 includes a plurality of optical elements. For example, one or more of the following optical elements may be included in the optical assembly 3330: an aperture, a Fresnel lens, a convex lens, a concave lens, a filter, a reflecting surface, or any other suitable optical element that deflects, reflects, refracts, and/or in some way alters image light. Moreover, the optical assembly 3330 may include combinations of different optical elements. In some embodiments, one or more of the optical elements in the optical assembly 3330 may have one or more coatings, such as partially reflective or antireflective coatings. The optical assembly 3330 can be integrated into a projection assembly, e.g., a projection assembly. In one embodiment, the optical assembly 3330 includes the optics block 135 shown in FIG. 1B.

In operation, the optical assembly 3330 magnifies and focuses image light generated by the display 3325. In so doing, the optical assembly 3330 enables the display 3325 to be physically smaller, weigh less, and consume less power than displays that do not use the optical assembly 3330. Additionally, magnification may increase the field of view of the content presented by the display 3325. For example, in some embodiments, the field of view of the displayed content partially or completely uses a user's field of view. For example, the field of view of a displayed image may meet or exceed 3310 degrees. In various embodiments, the amount of magnification may be adjusted by adding or removing optical elements.

In some embodiments, the optical assembly 3330 may be designed to correct one or more types of optical errors. Examples of optical errors include barrel or pincushion distortions, longitudinal chromatic aberrations, or transverse chromatic aberrations. Other types of optical errors may further include spherical aberrations, chromatic aberrations or errors due to the lens field curvature, astigmatisms, in addition to other types of optical errors. In some embodiments, visual content transmitted to the display 3325 is pre-distorted, and the optical assembly 3330 corrects the distortion as image light from the display 3325 passes through various optical elements of the optical assembly 3330. In some embodiments, optical elements of the optical assembly 3330 are integrated into the display 3325 as a projection assembly that includes at least one waveguide coupled with one or more optical elements.

The IMU 3340 is an electronic device that generates data indicating a position of the NED 3305 based on measurement signals received from one or more of the position sensors 3335 and from depth information received from the DCA 3320. In some embodiments of the NED 3305, the IMU 3340 may be a dedicated hardware component. In other embodiments, the IMU 3340 may be a software component implemented in one or more processors. In one embodiment, the IMU 3340 is the same component as the IMU 3315 of FIG. 22 and the position sensors 3335 are the same components as the position sensors 3320.

In operation, a position sensor 3335 generates one or more measurement signals in response to a motion of the NED 3305. Examples of position sensors 3335 include: one or more accelerometers, one or more gyroscopes, one or more magnetometers, one or more altimeters, one or more inclinometers, and/or various types of sensors for motion detection, drift detection, and/or error detection. The position sensors 3335 may be located external to the IMU 3340, internal to the IMU 3340, or some combination thereof.

Based on the one or more measurement signals from one or more position sensors 3335, the IMU 3340 generates data indicating an estimated current position of the NED 3305 relative to an initial position of the NED 3305. For example, the position sensors 3335 include multiple accelerometers to measure translational motion (forward/back, up/down, left/right) and multiple gyroscopes to measure rotational motion (e.g., pitch, yaw, and roll). In some embodiments, the IMU 3340 rapidly samples the measurement signals and calculates the estimated current position of the NED 3305 from the sampled data. For example, the IMU 3340 integrates the measurement signals received from the accelerometers over time to estimate a velocity vector and integrates the velocity vector over time to determine an estimated current position of a reference point on the NED 3305. Alternatively, the IMU 3340 provides the sampled measurement signals to the console 3310, which analyzes the sample data to determine one or more measurement errors. The console 3310 may further transmit one or more of control signals and/or measurement errors to the IMU 3340 to configure the IMU 3340 to correct and/or reduce one or more measurement errors (e.g., drift errors). The reference point is a point that may be used to describe the position of the NED 3305. The reference point may generally be defined as a point in space or a position related to a position and/or orientation of the NED 3305.

In various embodiments, the IMU 3340 receives one or more parameters from the console 3310. The one or more parameters are used to maintain tracking of the NED 3305. Based on a received parameter, the IMU 3340 may adjust one or more IMU parameters (e.g., a sample rate). In some embodiments, certain parameters cause the IMU 3340 to update an initial position of the reference point so that it corresponds to a next position of the reference point. Updating the initial position of the reference point as the next calibrated position of the reference point helps reduce drift errors in detecting a current position estimate of the IMU 3340.

In some embodiments, the eye tracking system 3345 is integrated into the NED 3305. The eye tracking system 3345 may comprise one or more illumination sources and an imaging device (camera). In operation, the eye tracking system 3345 generates and analyzes tracking data related to a user's eyes as the user wears the NED 3305. The eye tracking system 3345 may further generate eye tracking information that may comprise information about a position of the user's eye, i.e., information about an angle of an eye-gaze.

In some embodiments, the varifocal module 3350 is further integrated into the NED 3305. The varifocal module 3350 may be communicatively coupled to the eye tracking system 3345 in order to enable the varifocal module 3350 to receive eye tracking information from the eye tracking system 3345. The varifocal module 3350 may further modify the focus of image light emitted from the display 3325 based on the eye tracking information received from the eye tracking system 3345. Accordingly, the varifocal module 3350 can reduce vergence-accommodation conflict that may be produced as the user's eyes resolve the image light. In various embodiments, the varifocal module 3350 can be interfaced (e.g., either mechanically or electrically) with at least one optical element of the optical assembly 3330.

In operation, the varifocal module 3350 may adjust the position and/or orientation of one or more optical elements in the optical assembly 3330 in order to adjust the focus of image light propagating through the optical assembly 3330. In various embodiments, the varifocal module 3350 may use eye tracking information obtained from the eye tracking system 3345 to determine how to adjust one or more optical elements in the optical assembly 3330. In some embodiments, the varifocal module 3350 may perform foveated rendering of the image light based on the eye tracking information obtained from the eye tracking system 3345 in order to adjust the resolution of the image light emitted by the display 3325. In this case, the varifocal module 3350 configures the display 3325 to display a high pixel density in a foveal region of the user's eye-gaze and a low pixel density in other regions of the user's eye-gaze.

The I/O interface 3315 facilitates the transfer of action requests from a user to the console 3310. In addition, the I/O interface 3315 facilitates the transfer of device feedback from the console 3310 to the user. An action request is a request to perform a particular action. For example, an action request may be an instruction to start or end capture of image or video data or an instruction to perform a particular action within an application, such as pausing video playback, increasing or decreasing the volume of audio playback, and so forth. In various embodiments, the I/O interface 3315 may include one or more input devices. Example input devices include: a keyboard, a mouse, a game controller, a joystick, and/or any other suitable device for receiving action requests and communicating the action requests to the console 3310. In some embodiments, the I/O interface 3315 includes an IMU 3340 that captures calibration data indicating an estimated current position of the I/O interface 3315 relative to an initial position of the I/O interface 3315.

In operation, the I/O interface 3315 receives action requests from the user and transmits those action requests to the console 3310. Responsive to receiving the action request, the console 3310 performs a corresponding action. For example, responsive to receiving an action request, console 3310 may configure I/O interface 3315 to emit haptic feedback onto an arm of the user. For example, console 3315 may configure I/O interface 3315 to deliver haptic feedback to a user when an action request is received. Additionally or alternatively, the console 3310 may configure the I/O interface 3315 to generate haptic feedback when the console 3310 performs an action, responsive to receiving an action request.

The console 3310 provides content to the NED 3305 for processing in accordance with information received from one or more of: the DCA 3320, the NED 3305, and the I/O interface 3315. In the embodiment shown in FIG. 22, the console 3310 includes an application store 3355, a tracking module 3360, and an engine 3365. In some embodiments, the console 3310 may have additional, fewer, or different modules and/or components than those described in conjunction with FIG. 22. Similarly, the functions further described below may be distributed among components of the console 3310 in a different manner than described in conjunction with FIG. 22.

The application store 3355 stores one or more applications for execution by the console 3310. An application is a group of instructions that, when executed by a processor, performs a particular set of functions, such as generating content for presentation to the user. For example, an application may generate content in response to receiving inputs from a user (e.g., via movement of the NED 3305 as the user moves his/her head, via the I/O interface 3315, etc.). Examples of applications include: gaming applications, conferencing applications, video playback applications, or other suitable applications.

The tracking module 3360 calibrates the NED system 3300 using one or more calibration parameters. The tracking module 3360 may further adjust one or more calibration parameters to reduce error in determining a position and/or orientation of the NED 3305 or the I/O interface 3315. For example, the tracking module 3360 may transmit a calibration parameter to the DCA 3320 in order to adjust the focus of the DCA 3320. Accordingly, the DCA 3320 may more accurately determine positions of structured light elements reflecting off of objects in the environment. The tracking module 3360 may also analyze sensor data generated by the IMU 3340 in determining various calibration parameters to modify. Further, in some embodiments, if the NED 3305 loses tracking of the user's eye, then the tracking module 3360 may re-calibrate some or all of the components in the NED system 3300. For example, if the DCA 3320 loses line of sight of at least a threshold number of structured light elements projected onto the user's eye, the tracking module 3360 may transmit calibration parameters to the varifocal module 3350 in order to re-establish eye tracking.

The tracking module 3360 tracks the movements of the NED 3305 and/or of the I/O interface 3315 using information from the DCA 3320, the one or more position sensors 3335, the IMU 3340 or some combination thereof. For example, the tracking module 3360 may determine a reference position of the NED 3305 from a mapping of an area local to the NED 3305. The tracking module 3360 may generate this mapping based on information received from the NED 3305 itself. The tracking module 3360 may also utilize sensor data from the IMU 3340 and/or depth data from the DCA 3320 to determine references positions for the NED 3305 and/or I/O interface 3315. In various embodiments, the tracking module 3360 generates an estimation and/or prediction for a subsequent position of the NED 3305 and/or the I/O interface 3315. The tracking module 3360 may transmit the predicted subsequent position to the engine 3365.

The engine 3365 generates a three-dimensional mapping of the area surrounding the NED 3305 (i.e., the "local area") based on information received from the NED 3305. In some embodiments, the engine 3365 determines depth information for the three-dimensional mapping of the local area based on depth data received from the DCA 3320 (e.g., depth information of objects in the local area). In some embodiments, the engine 3365 calculates a depth and/or position of the NED 3305 by using depth data generated by the DCA 3320. In particular, the engine 3365 may implement various techniques for calculating the depth and/or position of the NED 3305, such as stereo based techniques, structured light illumination techniques, time-of-flight techniques, and so forth. In various embodiments, the engine 3365 uses depth data received from the DCA 3320 to update a model of the local area and to generate and/or modify media content based in part on the updated model.

The engine 3365 also executes applications within the NED system 3300 and receives position information, acceleration information, velocity information, predicted future positions, or some combination thereof, of the NED 3305 from the tracking module 3360. Based on the received information, the engine 3365 determines various forms of media content to transmit to the NED 3305 for presentation to the user. For example, if the received information indicates that the user has looked to the left, the engine 3365 generates media content for the NED 3305 that mirrors the user's movement in a virtual environment or in an environment augmenting the local area with additional media content. Accordingly, the engine 3365 may generate and/or modify media content (e.g., visual and/or audio content) for presentation to the user. The engine 3365 may further transmit the media content to the NED 3305. Additionally, in response to receiving an action request from the I/O interface 3315, the engine 3365 may perform an action within an application executing on the console 3310. The engine 3305 may further provide feedback when the action is performed. For example, the engine 3365 may configure the NED 3305 to generate visual and/or audio feedback and/or the I/O interface 3315 to generate haptic feedback to the user.

In some embodiments, based on the eye tracking information (e.g., orientation of the user's eye) received from the eye tracking system 3345, the engine 3365 determines a resolution of the media content provided to the NED 3305 for presentation to the user on the display 3325. The engine 3365 may adjust a resolution of the visual content provided to the NED 3305 by configuring the display 3325 to perform foveated rendering of the visual content, based at least in part on a direction of the user's gaze received from the eye tracking system 3345. The engine 3365 provides the content to the NED 3305 having a high resolution on the display 3325 in a foveal region of the user's gaze and a low resolution in other regions, thereby reducing the power consumption of the NED 3305. In addition, using foveated rendering reduces a number of computing cycles used in rendering visual content without compromising the quality of the user's visual experience. In some embodiments, the engine 3365 can further use the eye tracking information to adjust a focus of the image light emitted from the display 3325 in order to reduce vergence-accommodation conflicts.

In light of these examples, some of the embodiments can be described as follows.

In accordance with some embodiments, an optical system includes an eye tracking module configured to determine eye position information; a control module configured to determine a first direction for steering light based on the eye position information; and a first optical module including a switchable polarization-sensitive element configured to direct light incident on the first optical module into the first direction.

In some embodiments, the first optical module includes a plurality of grating layers; and each grating layer included in the plurality of grating layers is configured to be individually switched on or switched off so that the light incident on the first optical module is directed into the first direction by causing one or more grating layers of the plurality of grating layers to switch on or to switch off.

In some embodiments, each grating layer of the plurality of grating layers is configured to steer light incident on the grating layer by an angle that is distinct from steering angles of the other grating layers of the plurality of grating layers.

In some embodiments, the optical system includes a lens module configured to focus the light incident on the first optical module at a location that corresponds to the eye position information.

In some embodiments, the control module is further configured to transmit an electronic signal to the first optical module causing the first optical module to scan through multiple directions for directing the light incident on the first optical module.

In some embodiments, the optical system includes an image source configured to generate the light incident on the first optical module.

In some embodiments, the first optical module includes one or more electronically switchable liquid crystal (LC) cells that are configured to selectively provide half-wave phase retardance for modifying a polarization of the light incident on the first optical module.

In some embodiments, the first direction corresponds to a location of a pupil of an eye of a user of the optical system.

In some embodiments, the first optical module comprises multiple layers of liquid crystals, and at least one layer of liquid crystals applies a phase shift to the light incident on the first optical module across an area of the layer of liquid crystals.

In some embodiments, the optical system includes a second optical module having a steering axis that is substantially perpendicular to a steering axis of the first optical module, wherein the control module is further configured to determine a second direction for steering light incident on the second optical module.

In some embodiments, the first optical module comprises a Pancharatnam-Berry Phase (PBP) grating.

In some embodiments, the PBP grating is a switchable grating, or the PBP grating is a passive grating, and the first optical module includes a switchable half-wave plate optically coupled with the passive PBP grating.

In some embodiments, the first optical module includes a plurality of grating layers, each grating layer included in the plurality of grating layers includes a PBP grating configured to have a predefined steering angle that is distinct from a steering angle of any other PBP grating included in the two or more grating layers.

In some embodiments, the first optical module comprises a switchable Bragg grating (SBG).

In some embodiments, the first optical module includes a plurality of grating layers, each grating layer included in the plurality of grating layers includes a SBG configured to have a predefined steering angle that is distinct from a steering angle of any other SBG included in the two or more grating layers.

In some embodiments, the SBG includes a transmissive mode SBG.

In some embodiments, the SBG includes a reflective mode SBG.

In accordance with some embodiments, a near-eye display device includes an image source configured to generate image light; an eye tracking module configured to determine eye position information; and an optical module including a switchable polarization-sensitive element configured to direct the image light to a first direction associated with the eye position information.

In some embodiments, the optical module comprises a plurality of grating layers; and each grating layer included in the plurality of grating layers is configured to be individually switched on or switched off so that causing one or more grating layers included in the plurality of grating layers to switch on or to switch off directs the light incident on the optical module to the first direction.

In accordance with some embodiments, a method includes determining an eye position associated with an eye to which an image is to be presented; determining, based, at least in part, on the eye position, a steer direction for directing image light associated with the image toward the eye; and transmitting an electronic signal corresponding to the steer direction to an optical module configured to direct the image light into the steer direction.

In accordance with some embodiments, an optical system includes a first polarization-sensitive module configured to direct real-world light incident on the first polarization-sensitive module in a first direction determined based, at least in part, on eye position information; a second polarization-sensitive module configured to direct virtual-world light incident on the second module in a second direction determined based, at least in part, on the eye position information; and an optical module disposed between the first polarization-sensitive module and the second polarization-sensitive module and configured to transmit the real-world light incident on the optical module toward the second polarization-sensitive module and to direct the virtual-world light toward the second polarization-sensitive module.

In some embodiments, the optical system includes an eye tracking module configured to determine the eye position information.

In some embodiments, the optical module is configured to reflect the virtual-world light toward the second polarization-sensitive module.

In some embodiments, the first polarization-sensitive module is configured to steer the real-world light by a first angle, and the second polarization-sensitive module is configured to steer the real-world light by a second angle that is substantially equal in magnitude and opposite in sign to the first angle.

In some embodiments, the optical system includes a control module configured to: transmit a first set of electronic signals to the first polarization-sensitive module to control, based on the eye position information, a first steering angle for directing the real-world light; and transmit a second set of electronic signals to the second polarization-sensitive module to control, based on the eye position information, a second steering angle for directing the virtual-world light.

In some embodiments, the optical module includes an optical waveguide with a light out-coupling surface that faces the second polarization-sensitive module and is configured to relay the virtual-world light along the optical waveguide to the second polarization-sensitive module.

In some embodiments, the optical module includes a holographic grating coupled with the optical waveguide for out-coupling the virtual-word light from the optical waveguide.

In some embodiments, the optical system includes an image source configured to generate the virtual-world light.

In some embodiments, the real-world light incident on the first polarization-sensitive module has a first polarization, and the optical module is further configured to change a second polarization of the virtual-world light incident on the second polarization-sensitive module to the first polarization.

In some embodiments, the optical system includes a lens module configured to focus the virtual-world light.

In some embodiments, the lens module comprises a polarization-sensitive Pancharatnam-Berry Phase (PBP) lens.

In some embodiments, at least one of the first polarization-sensitive module and the second polarization-sensitive module comprises a Pancharatnam-Berry Phase (PBP) grating.

In some embodiments, at least one of the first polarization-sensitive module and the second polarization-sensitive module comprises a switchable Bragg grating (SBG).

In some embodiments, at least one of the first polarization-sensitive module and the second polarization-sensitive module comprises a polarization volume grating (PVG).

In accordance with some embodiments, a near-eye display device includes an image source configured to generate virtual-world light; an eye tracking module configured to determine eye position information; a first polarization-sensitive module configured to direct real-world light incident on the first polarization-sensitive module in a first direction determined based, at least in part, on the eye position information; and a second polarization-sensitive module configured to direct the virtual-world light incident on the second module in a second direction determined based, at least in part, on the eye position information.

In some embodiments, the first polarization-sensitive module is configured to direct the real-world light at a first angle, and the second polarization-sensitive module is configured to direct the first steered light at a second angle that is substantially equal in magnitude and opposite in sign to the first angle.

In some embodiments, the near-eye display device includes an optical module disposed between the first polarization-sensitive module and the second polarization-sensitive module and configured to transmit the real-world light incident on the optical module toward the second polarization-sensitive module and to reflect the virtual-world light toward the second polarization-sensitive module.

In some embodiments, the near-eye display device includes a lens module configured to focus the virtual-world light.

In accordance with some embodiments, an optical system includes an eye tracking module configured to determine eye position information; a first polarization-sensitive module configured to direct real-world light incident on the first polarization-sensitive module in a first direction determined based, at least in part, on the eye position information; and a second polarization-sensitive module configured to direct virtual-world light incident on the second module in a second direction determined based, at least in part, on the eye position information.

In accordance with some embodiments, an optical system includes an eye tracking module configured to determine eye position information; a control module configured to determine a first direction for steering light based on the eye position information; and a polarization-sensitive module that includes a polarization volume grating configured to direct into the first direction at least a first portion of light having a first polarization.

In some embodiments, the polarization volume grating is configured to transmit at least a second portion of the light having a second polarization that is orthogonal to the first polarization through the polarization volume grating.

In some embodiments, the polarization volume grating is configured to steer the first portion of light having the first polarization by an angle greater than a predefined angle and steer of the second portion of light having the second polarization by an angle less than the predefined angle.

In some embodiments, the control module is configured to: transmit a first electronic signal to the polarization volume grating at a first time, configuring the polarization volume grating to direct the first portion of light into the first direction; and transmit a second electronic signal to the polarization volume grating at a second time that is distinct from the first time, configuring the polarization volume grating to direct the first portion of light into a direction that is distinct from the first direction.

In some embodiments, the polarization-sensitive module comprises a plurality of grating layers, wherein each grating layer included in the plurality of grating layers is configured to be individually switched on or switched off so that switching on or switching off one or more grating layers included in the plurality of grating layers causes the light incident on the polarization-sensitive module to be directed into the first direction.

In some embodiments, each of two or more grating layers included in the plurality of grating layers includes a polarization volume grating, each polarization volume grating included in a respective grating layer is configured to have a predefined steering angle that is distinct from a steering angle of any other polarization volume grating included in the two or more grating layers.

In some embodiments, the optical system includes an image source configured to provide virtual-world light for subsequent steering by the polarization-sensitive module.

In some embodiments, the optical system includes an optical module configured to receive the virtual-world light from the image source and direct the virtual-world light toward the polarization-sensitive module and to transmit real-world light toward the polarization-sensitive module.

In some embodiments, the optical module is configured to reflect the virtual-world light toward the polarization-sensitive module.

In some embodiments, the optical module includes an optical waveguide with a light out-coupling surface that faces the polarization-sensitive module and is configured to relay the virtual-world light along the optical waveguide.

In some embodiments, the optical system includes a polarizing element configured to modify polarization of the real-world light.

In some embodiments, the optical system includes one or more optical components located between the optical module and the polarization-sensitive module, the one or more optical components configured to focus the virtual-world light from the optical module.

In some embodiments, the first direction corresponds to a location of a pupil of an eye of a user of the optical system.

In some embodiments, the polarization-sensitive module is further configured to focus the at least the first portion of light.

In some embodiments, the optical system includes a lens module configured to focus the virtual-world light incident on the polarization-sensitive module.

In some embodiments, the lens module comprises a Pancharatnam-Berry Phase (PBP) lens.

In some embodiments, the lens module comprises a pancake lens.

In accordance with some embodiments, a near-eye display device includes any optical system described herein.

In accordance with some embodiments, a method includes determining an eye position associated with an eye to which an image is to be presented; determining, based, at least in part, on the eye position, a steer direction for directing image light associated with the image toward the eye; and transmitting at a first time a first electronic signal corresponding to the steer direction to a polarization volume grating so that the polarization volume grating is configured for directing the image light into the steer direction.

In some embodiments, the method includes transmitting at a second time distinct from the first time a second electronic signal to the polarization volume grating, thereby configuring the polarization volume grating for directing the image light into a direction distinct from the steer direction.

In accordance with some embodiments, an optical system includes an eye tracking module configured to determine eye position information; a control module configured to determine a first direction for steering light based on the eye position information; and a polarization-sensitive module that includes an optical phased array configured to direct light incident on the optical phased array into the first direction.

In some embodiments, the optical phased array includes liquid crystals located between two substrates, a first substrate of the two substrates having a plurality of electrodes thereon and a second substrate of the two substrates having one or more electrodes.

In some embodiments, the plurality of electrodes includes a first set of electrodes configured to receive a first voltage and a second set of electrodes configured to receive a second voltage that is distinct from the first voltage.

In some embodiments, the control module is configured to: provide, at a first time, the first voltage to the first set of electrodes and provide the second voltage to the second set of electrodes so that the light incident on the optical phased array is directed into the first direction.

In some embodiments, the control module is configured to provide, at a second time distinct from the first time, a third voltage distinct from the first voltage to the first set of electrodes or a fourth voltage distinct from the second voltage to the second set of electrodes so that the light incident on the optical phased array is directed into a direction distinct from the first direction.

In some embodiments, at the second time, the eye tracking module determines second eye position information; the control module determines a second direction for steering light based on the second eye position information; and the optical phased array is configured to direct light incident on the optical phased array into the second direction.

In some embodiments, the control module is configured to provide, at a first time, a first voltage to a first subset of electrodes included in the plurality of electrodes and a second voltage distinct from the first voltage to the other electrodes included in the plurality of electrodes, the first subset of electrodes being spaced apart by a first distance so that the light incident on the optical phased array is directed into the first direction.

In some embodiments, the control module is configured to provide, at a second time distinct from the first time, the first voltage to a second subset of electrodes included in the plurality of electrodes and the second voltage to the other electrodes included in the plurality of electrodes, the second subset of electrodes being spaced apart by a second distance that is distinct from the first distance so that the light incident on the optical phased array is directed into a direction distinct from the first direction.

In some embodiments, at the second time, the eye tracking module determines second eye position information; the control module determines a second direction for steering light based on the second eye position information; and the optical phased array is configured to direct the light incident on the optical phased array into the second direction.

In some embodiments, the polarization-sensitive module includes a plurality of grating layers, wherein each grating layer included in the plurality of grating layers includes an optical phased array.

In some embodiments, the optical system includes an image source configured to provide virtual-world light for subsequent steering by the optical phased array.

In some embodiments, the optical system includes an optical module configured to receive the virtual-world light from the image source and direct the virtual-world light toward the optical phased array and to transmit real-world light toward the optical phased array.

In some embodiments, the optical module is configured to reflect the virtual-world light toward the optical phased array.

In some embodiments, the optical module includes an optical waveguide with a light out-coupling surface that faces the polarization-sensitive module and is configured to relay the virtual-world light along the optical waveguide.

In some embodiments, the optical system includes a polarizing element configured to modify polarization of the real-world light.

In some embodiments, the optical system includes a lens module configured to focus the virtual-world light incident on the polarization-sensitive module.

In some embodiments, the lens module comprises a Pancharatnam-Berry Phase (PB) lens.

In accordance with some embodiments, a method includes determining an eye position associated with an eye to which an image is to be presented; determining, based, at least in part, on the eye position, a steer direction for directing image light associated with the image toward the eye; and transmitting at a first time a first electronic signal corresponding to the steer direction to an optical phased array so that the optical phased array is configured for directing the image light into the steer direction.

In some embodiments, the method includes transmitting at a second time distinct from the first time a second electronic signal to the optical phased array, thereby configuring the optical phased array to direct the image light into a direction distinct from the steer direction.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the disclosed subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to some embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in various figures. illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in such figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. An optical system, comprising:
   an eye tracking module configured to determine eye position information;
   a control module configured to determine a first direction for steering light based on the eye position information;
   a first optical module including a switchable polarization-sensitive element configured to direct light incident on the first optical module into the first direction; and
   a viewing optical system including a reflective grating for directing light from an image source toward the first optical module in directions that include a direction that is non-perpendicular to the first optical module.

2. The optical system of claim 1, wherein
   the first optical module includes a plurality of grating layers; and
   each grating layer included in the plurality of grating layers is configured to be individually switched on or switched off so that the light incident on the first optical module is directed into the first direction by causing one or more grating layers of the plurality of grating layers to switch on or to switch off.

3. The optical system of claim 2, wherein each grating layer of the plurality of grating layers is configured to steer light incident on the grating layer by an angle that is distinct from steering angles of the other grating layers of the plurality of grating layers.

4. The optical system of claim 1, wherein the control module is further configured to transmit an electronic signal to the first optical module causing the first optical module to scan through multiple directions for directing the light incident on the first optical module.

5. The optical system of claim 1, further comprising the image source positioned off an optical axis of the first optical module, the image source configured to generate the light incident on the first optical module.

6. The optical system of claim 1, further comprising the viewing optical system configured to reflect the light from the image source toward the first optical module.

7. The optical system of claim 1, wherein the first optical module includes one or more electronically switchable liquid crystal (LC) cells that are configured to selectively provide half-wave phase retardance for modifying a polarization of the light incident on the first optical module.

8. The optical system of claim 1, wherein the first direction corresponds to a location of a pupil of an eye of a user of the optical system.

9. The optical system of claim 1, wherein the first optical module comprises multiple layers of liquid crystals, and at least one layer of liquid crystals applies a phase shift to the light incident on the first optical module across an area of the layer of liquid crystals.

10. The optical system of claim 1, wherein the first optical module comprises a Pancharatnam-Berry Phase (PBP) grating.

11. The optical system of claim 10, wherein
    the PBP grating is a switchable grating, or
    the PBP grating is a passive grating, and the first optical module includes a switchable half-wave plate optically coupled with the passive PBP grating.

12. The optical system of claim 10, wherein the first optical module includes a plurality of grating layers, each grating layer included in the plurality of grating layers includes a PBP grating configured to have a predefined steering angle that is distinct from a steering angle of any other PBP grating included in the plurality of grating layers.

13. The optical system of claim 1, wherein the first optical module comprises a switchable Bragg grating (SBG).

14. The optical system of claim 13, wherein the first optical module includes a plurality of grating layers, each grating layer included in the plurality of grating layers includes a SBG configured to have a predefined steering angle that is distinct from a steering angle of any other SBG included in the plurality of grating layers.

15. The optical system of claim 13, wherein the SBG includes a transmissive mode SBG.

16. The optical system of claim 13, wherein the SBG includes a reflective mode SBG.

17. A near-eye display device, comprising:
    an image source configured to generate image light; and
    the optical system of claim 1.

18. The near-eye display device of claim 17, wherein
    the first optical module comprises a plurality of grating layers; and
    each grating layer included in the plurality of grating layers is configured to be individually switched on or switched off so that causing one or more grating layers included in the plurality of grating layers to switch on or to switch off directs the image light incident on the first optical module to the first direction.

19. An optical system, comprising:
an eye tracking module configured to determine eye position information;
a control module;
a first optical module including a first switchable polarization-sensitive element with a first plurality of grating layers; and
a second optical module including a second switchable polarization-sensitive element with a second plurality of grating layers, the second optical module having a steering axis that is substantially perpendicular to a steering axis of the first optical module, wherein the control module is configured to determine, based on the eye position information, a first direction for steering light incident on the first optical module and a second direction for steering light incident on the second optical module.

20. A method for steering light, comprising:
determining an eye position associated with an eye to which an image is to be presented;
determining, based, at least in part, on the eye position, a steer direction for directing image light associated with the image toward the eye;
directing, with a viewing optical system including a reflective grating, the image light from an image source toward an optical module in directions that include a direction that is non-perpendicular to the optical module; and
transmitting an electronic signal corresponding to the steer direction to the optical module configured to direct the image light into the steer direction.

* * * * *